US007037527B2

(12) United States Patent
Bide et al.

(10) Patent No.: US 7,037,527 B2
(45) Date of Patent: May 2, 2006

(54) BIFUNCTIONALIZED POLYESTER MATERIAL FOR SURFACE TREATMENT AND BIOMODIFICATION

(75) Inventors: Martin J. Bide, Wavefield, RI (US); Matthew D. Phaneuf, Ashland, MA (US); William C. Quist, Brookline, MA (US); Donald J. Dempsey, Newbury, MA (US); Frank W. LoGerfo, Cambridge, MA (US)

(73) Assignees: University of Rhode Island, Kingston, RI (US); Beth Israel Deaconess Medical Center, Boston, MA (US); BioMod Surfaces, Salisbury, MA (US)

( * ) Notice: Subject to any disclaimer, the term of this patent is extended or adjusted under 35 U.S.C. 154(b) by 0 days.

(21) Appl. No.: 10/352,286

(22) Filed: Jan. 27, 2003

(65) Prior Publication Data

US 2003/0216524 A1  Nov. 20, 2003

Related U.S. Application Data

(60) Provisional application No. 60/351,760, filed on Jan. 25, 2002.

(51) Int. Cl.
*A61K 31/765* (2006.01)
*A61F 13/00* (2006.01)
*C08L 67/02* (2006.01)

(52) U.S. Cl. ................ 424/486; 424/78.06; 424/78.07; 424/422; 424/445; 525/420; 525/437; 528/288; 528/332; 528/335; 602/42; 602/48; 602/52

(58) Field of Classification Search ................ 424/445, 424/422, 486, 78.06, 78.07; 525/437, 420; 528/288, 332, 335; 602/42, 48, 52
See application file for complete search history.

(56) References Cited

U.S. PATENT DOCUMENTS

| 4,769,436 | A | * | 9/1988 | Beck et al. .................... 528/75 |
| 4,981,591 | A | * | 1/1991 | Ostreicher ................ 210/502.1 |
| 5,229,172 | A | * | 7/1993 | Cahalan et al. .............. 427/536 |
| 5,384,387 | A | * | 1/1995 | Tyrell et al. ................. 528/292 |
| 5,635,216 | A | * | 6/1997 | Thompson ................... 424/501 |
| 5,798,115 | A |   | 8/1998 | Santerre et al. |
| 6,136,333 | A | * | 10/2000 | Cohn et al. .................. 424/423 |
| 6,165,952 | A | * | 12/2000 | Abramshe et al. .......... 508/477 |
| 6,187,875 | B1| * | 2/2001 | Bergmans et al. .......... 525/438 |
| 2002/0155225 | A1| * | 10/2002 | Yeh et al. ................. 427/407.1 |

OTHER PUBLICATIONS

Avny and Rebenfeld, "Chemical Modification of Polyester Fiber Surfaces by Amination Reactions with Multifunctional Amines," *Journal of Applied Polymer Science* 32:4009-4025 (1986).
Berceli et al., "Evaluation of a Novel Hirudin-Coated Polyester Graft to Physiologic Flow Conditions: Hirudin Bioavailability and Thrombin Uptake," *Journal of Vascular Surgery* 27:1117-1127 (1998).
Dempsey et al., "Synthesis of a Novel Small Diameter Polyurethane Vascular Graft with Reactive Binding Sites," *American Society for Artificial Internal Organs Journal* 44:M506-M510 (1998).
Ellison et al., "Physical Properties of Polyester Fibers Degraded by Aminolysis and by Alkaline Hydrolysis," *Journal of Applied Polymer Science* 27:247-257 (1982).
Farrow et al., "The Degradation of Polyethylene Terephthalate by Methylamine- A Study by Infra-red and X-ray Methods," *Polymer* 3:17-25 (1962).
Ito et al. "Thrombin Inhibition by Covalently Bound Hirudin," *Blood Coagulation and Fibrinolysis* 2:77-81 (1991).
Kottke-Marchant et al., "Effect of Albumin Coating on the In Vitro Blood Compatibility of Dacron® Arterial Prostheses," *Biomaterials* 10:147-155 (1989).
Kubaska et al., "Characterization of Covalently Bound Vascular Endothelial Growth Factor: Creation of a Novel Dacron Prosthetic Graft Surface," *Surgical Forum* 49:322-324 (1998).
Lin et al., "Synthesis, Surface, and Cell-Adhesion Properties of Polyurethanes Containing Covalently Grafted RGD-Peptides," *Journal of Biomedical Materials Research* 28: 329-342 (1994).
Ozaki et al., "Glycoconjugate Mediated Endothelial Cell Adhesion to Dacron Polyester Film," *Journal of Vascular Surgery* 18:486-494 (1993).
Ozaki et al. "*In Vivo* Testing of an Infection-Resistant Vascular Graft Material," *Journal of Surgical Research* 55:543-547 (1993).
Park et al., "Heparin Immobilization onto Segmented Polyurethaneurea Surfaces-Effect of Hydrophilic Spacers," *Journal of Biomedical Materials* 22:977-992 (1988).
Phaneuf et al., "Application of the Quinolone Antibiotic Ciprofloxacin to Dacron Utilizing Textile Dyeing Technology," *Journal of Biomedical Materials Research* 27:233-237 (1993).
Phaneuf et al., "Covalent Linkage of Streptokinase to Recombinant Hirudin: A Novel Thrombolytic Agent with Antithrombotic Properties," *Thrombosis and Haemostasis* 71:481-487 (1994).

(Continued)

*Primary Examiner*—Jeffrey B. Robertson
(74) *Attorney, Agent, or Firm*—Clark & Elbing LLP

(57) ABSTRACT

The invention features a method of treating polyester material to generate functional carboxylic acid and amine groups. These functional groups can be used as sites for covalent bond formation to attach chemical or biological moieties. This bifunctionalized polyester polymer can be used in any medical application in which biocompatible polymers are used.

26 Claims, 22 Drawing Sheets

OTHER PUBLICATIONS

Phaneuf et al., "Modification of Polyethylene Terephthalate (Dacron) Via Denier Reduction: Effects on Material Tensile Strength, Weight, and Protein Binding Capabilities," *Journal of Applied Biomaterials* 6:289-299 (1995).

Phaneuf et al., "Covalent Linkage of Recombinant Hirudin to Poly(Ethylene Terephthalate) (Dacron): Creation of a Novel Antithrombin Surface," *Biomaterials* 18:755-765 (1997).

Phaneuf et al., "Chemical and Physical Characterization of a Novel Poly(Carbonate Urea) Urethane Surface with Protein Crosslinker Sites," *Journal of Biomaterials Applications* 12:100-120 (1997).

Phaneuf et al., "Bioengineering of a Novel Small Diameter Polyurethane Vascular Graft with Covalently Bound Recombinant Hirudin," *American Society for Artificial Internal Organs Journal* 44:M653-M658 (1998).

Phaneuf et al. "Covalent Linkage of Recombinant Hirudin to a Novel Ionic Poly (carbonate) Urethane Polymer with Protein Binding Sites: Determination of Surface Antithrombin Activity," *Artificial Organs* 22:657-665 (1998).

Phaneuf et al. "Coating of Dacron Vascular Grafts with an Ionic Polyurethane: A Novel Sealant with Protein Binding Properties," *Biomaterials* 22:463-469 (2001).

Phaneuf et al., "Development of Infection Resistant Polyurethane Biomaterials Using Textile Dyeing Technology," *American Society for Artificial Internal Organs Journal* 47:634-640 (2001).

Rumisek et al., "The Influence of Early Surface Thromboreactivity on Long-Term Arterial Graft Patency," *Surgery* 105:654-661 (1989).

Stone et al., "*In vitro* Study of Vascular Endothelial Growth Factor for Bioengineering Improved Prosthetic Vascular Grafts," *Current Surgery* 57:506-507 (2000).

Stone et al., "A Biologically Active VEGF Construct *in vitro*: Implications for Bioengineering-improved Prosthetic Vascular Grafts," *Journal of Biomedical Materials Research* 59:160-165 (2002).

Wyers et al., "*In Vivo* Assessment of a Novel Dacron Surface with Covalently Bound Recombinant Hirudin," *Cardiovascular Pathology* 8:153-159 (1999).

Zahn et al., "Aminolysis of Polyehtylene Terephthalate," *Polymer* 3:429-432 (1962).

\* cited by examiner

Fig. 4

Variations in Concentration

| A | B | C |
|---|---|---|
| 100% EDA /water<br>Treatment: 80 minutes<br>10 mins rinse in water<br>Test in Methylene Blue at ph 8 | 90% EDA / water<br>Treatment: 80 minutes<br>10 mins rinse in water<br>Test in Methylene Blue at ph 8 | 80% EDA / water<br>Treatment: 80 minutes<br>10 mins rinse in water<br>Test in Methylene Blue at ph 8 |
| D | E | |
| 70% EDA / water<br>Treatment: 80 minutes<br>10 mins rinse in water<br>Test in Methylene Blue at ph 8 | 50% EDA / water<br>Treatment: 80 minutes<br>10 mins rinse in water<br>Test in Methylene Blue at ph 8 | |

Variations in Concentration

Fig. 6

Variations in Concentration

| A  100% EDA Treatment: 80 minutes 10 mins rinse in toluene Test in Methylene Blue at ph 8 | B 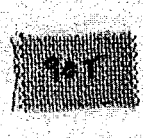 90% EDA / Toluene Treatment: 80 minutes 10 mins rinse in toluene Test in Methylene Blue at ph 8 | C  80% EDA / Toluene Treatment: 80 minutes 10 mins rinse in toluene Test in Methylene Blue at ph 8 |
|---|---|---|
| D 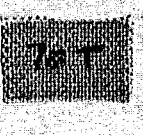 70% EDA / Toluene Treatment: 80 minutes 10 mins rinse in toluene Test in Methylene Blue at ph 8 | E  50% EDA / Toluene Treatment: 80 minutes 10 mins rinse in toluene Test in Methylene Blue at ph 8 | F 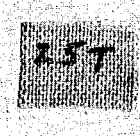 25% EDA / Toluene Treatment: 80 minutes 10 mins rinse in toluene Test in Methylene Blue at ph 8 |

BIFUNCTIONALIZED POLYESTER MATERIAL FOR SURFACE TREATMENT AND BIOMODIFICATION

CROSS REFERENCE TO RELATED APPLICATIONS

This application claims the benefit of the filing date of United States Provisional Application No. 60/351,760, filed Jan. 25, 2002.

FIELD OF THE INVENTION

The invention relates to modification of polyester materials.

BACKGROUND OF THE INVENTION

Polyester (DACRON® or polyethylene terephthalate) fibers were first characterized in 1941 and have become the most widely produced synthetic fiber in the world. They are most familiarly known by the DuPont commercial name DACRON®. The polymer is synthesized by a condensation reaction of derivatives of ethylene glycol and terephthalic acid, resulting in molecules that contain 80 to 100 repeat units. These molecules are then extruded through a plurality of holes (a spinneret) to produce multi-filament fibrous filaments. Such DACRON® fibers are further processed into various structures such as warp-knit, weft-knit, and woven fabrics that have excellent resiliency as well as resistance to a wide range of chemical and biological challenges.

DACRON® is utilized in items ranging from clothing to medical implants. DACRON® yarn was first sewn into a tubular form and utilized as a large-diameter vascular graft in the mid-1950s. Since that point, DACRON® has been incorporated into both large and medium bore vascular grafts in knitted and woven form. These grafts have shown excellent long-term biodurability, handling characteristics and capsular tissue incorporation.

Polyester is known as a relatively inert fiber. It is hydrophobic, both in bulk and in its surface properties. At normal temperatures it has low uptake of moisture, dyes and other chemicals. In normal textile use, it tends to suffer associated disadvantages: it generates static electricity, it does not readily shed oily soils, and it does not wet enough to encourage the wicking of water. For applications where repellency is required, however, it is insufficiently hydrophobic, and repellent finishes are applied. Like any fiber, softness is advantageous, and chemical softeners are applied.

Modifications to overcome these deficiencies typically rely on the surface deposition of polymeric textile finishes. These include silicones, vinyl and acrylic polymers, and fluorochemicals. Other finishes are based on an ester interchange reaction that fixes a hydrophilic moiety (typically a short chain polyethylene oxide). Many of these finishes suffer a lack of durability to laundering and dry cleaning, since (other than those bonded via ester interchange) they are not covalently bonded to the polyester surface.

Polyester is employed for various medical devices such as prosthetic vascular grafts, prosthetic heart valve sewing cuffs, left ventricular assist devices, artificial organs, wound patches and wound dressings. Polyester is a biodurable material due to the relatively inert properties of the polymer and can persist for greater than 10 years when implanted without significant deleterious effects to the specific device. However, this material, similar to other biomaterials, is prone to 3 major complications when implanted: 1) thrombosis (clot formation), 2) infection and 3) lack of cell appropriate healing. These adverse properties occur as a result of the bulk properties of the polymer. Additionally, the rigidity of the polymer limits surface modification in order to incorporate various moieties such as anti-thrombolytic agents (e.g., anti-thrombin), thrombolytic agents, growth-promoting factors, growth-inhibiting factors, and antimicrobial/antifungal agents.

A complication of all implantable biomaterials is incompatibility between blood and the biomaterial surface. The initial interaction of blood and the foreign surface results in an array of activation or biologic responses: platelet activation and adhesion, activation of the intrinsic pathway of the coagulation cascade resulting in formation of active thrombin, leukocyte activation and the release of complement and kallikrein. If unregulated, these responses lead to surface thrombus formation with subsequent failure of the implanted biomaterial.

Numerous attempts have been made to create a more biocompatible surface by establishing a new biologic lining on the luminal surface that would "passivate" this acute initial reaction. These efforts have ranged from non-specifically binding albumin to the surface followed by heat denaturation to non-specifically crosslinking albumin, gelatin and collagen. Covalent or ionic binding of the anticoagulant heparin alone, in conjunction with other biologic compounds, or with spacer moieties as well as covalent linkage of thrombomodulin have also been performed. Other studies have focused on modifying the composition of the biomaterial by either increasing hydrophilicity via incorporation of polyethylene oxide groups or by creating an ionically charged surface.

Each of these methodologies has had limited success in creating a durable, biologically-active surface. There are several limitations associated with these surface modifications: 1) thrombin is not directly inhibited therefore fibrinogen amounts remain constant on the material surface permitting platelet adhesion, 2) heparin-coated biomaterials may be subject to heparitinases limiting long-term use of these materials, 3) non-specifically bound compounds are desorbed from the surface which is under shear stresses thereby re-exposing the thrombogenic biomaterial surface, 4) rapid release of non-specifically bound compounds may create an undesired systemic effect and 5) charge-based polymers may be covered by other blood proteins such that anticoagulant effects are masked.

Endothelial cells play a pivotal role in mediating blood interaction with the arterial wall. These cells maintain hemostasis and also synthesize growth mediators that block abnormal smooth muscle cell proliferation. Ideally, prosthetic grafts should promote endothelial cell adherence and growth on the luminal surface while permitting direct host tissue incorporation at the capsular surface. This type of cellular incorporation does not occur in actuality, thereby predisposing these grafts to infection, thrombosis, perigraft seromas and delayed graft failure. Thus, failure of appropriate cell type growth and development to these biomaterials significantly limits their expanded use.

To avert these complications and mimic the non-thrombogenic in vivo endothelial cell blood vessel lining, cell adhesion to prosthetic grafts using endothelial cell seeding techniques have been extensively employed. Adhesive proteins such as fibronectin, fibrinogen, vitronectin and collagen have served well in graft seeding protocols. The cell attachment properties of these matrices can also be duplicated by short peptide sequences such as RGD (Arg-Gly- Asp). These adhesive proteins, however, have several drawbacks: 1) bacterial pathogens recognize and bind to these sequences, 2) non-endothelial cell lines also bind to these sequences, 3) patients requiring a seeded vascular graft have few donor endothelial cells, therefore cells must be grown in culture and 4) endothelial cell loss to shear forces remains a significant obstacle.

Modification of the surface has also been employed to modify host response to the foreign body, serving as an approach for improving endothelial cell adherence to DACRON®. Endothelial cells after seeding have been shown to attach and grow on a variety of protein substrates coated onto vascular graft materials. Bioactive oligopeptides and cell growth factors have been immobilized onto various polymers and demonstrated to affect cell adherence and growth. Additional studies have described the incorporation of growth factors into a degradable protein mesh, resulting in the formation of capillaries into the graft wall. Utilizing these techniques to incorporate growth factors, however, does have major limitations: 1) growth factor is rapidly released from the matrix, 2) matrix degradation re-exposes the thrombogenic surface, thus endothelialization is not uniform and 3) release of non-endothelial specific growth factor is not confined to the biomaterial matrix, thereby exposing the "normal" distal artery to the growth factor.

There have been several studies assessing the effects of amine interaction with polyester. Zahn et al. (*Polymer* 3:429, 1962), as well as Farrow et al. (*Polymer* 3:17, 1962) assessed the lysis of polyester in an attempt to breakdown excess material in the textile industry into smaller components, without regard to maintaining the integrity of the polymer structure. In 1982, Ellison et. al. examined the effects of a monofunctional amine versus alkali hydrolysis on polyester. These studies, which again were performed under harsh conditions, demonstrated that alkaline hydrolysis has a more substantial effect on fiber weight without extensive strength loss. In contrast, aminolysis had less effect on fiber weight but a greater effect on fiber strength, indicative of a permanent reaction within the polymer structure. In 1968, Avny and Rebenfeld demonstrated that multifunctional amine compounds could be reacted within the polymer structure (three or more amine groups) while presenting minimal loss in strength (*Applied Polymer Science* 32:4009, 1986). There remains a need, however, for a polyester material that provides functional moieties for attachment of commercial finishes or biologically-active agents, while retaining material strength.

SUMMARY OF THE INVENTION

This invention features a method of generating a functionalized polyester material. This method includes incubating the polyester material with ethylene diamine in solution (aqueous or organic) under conditions that result in functionalization of the polyester material. The functionalization of the material consists of creation of carboxylic acid and amine groups within the polyester backbone. The carboxylic acid and amine groups can then be used as sites to attach other chemical compounds and biologically-active agents to the polyester backbone via an ionic or covalent bond.

In a desired embodiment, the chemical compound consists of a commercial finish selected from the group consisting of flame retardants, repellents, antistatic agents, and dyes.

In several desired embodiments, the biologically-active agent applied to the bifunctionalized polyester polymer is desirably a small molecule (e.g., an organic compound with a mw<1000), but can also include, for example, a peptide, a polypeptide, a protein, a nucleic acid molecule, or an antibody. The biologically-active agent can act as an antimicrobial agent, an antifungal agent, an anti-thrombolytic agent (e.g., anti-thrombin), a thrombolytic agent, an antiviral agent, an antiseptic agent, an antibiotic, a growth-inhibiting agent, a growth-promoting agent, or a combination thereof. The antibiotic used in the method can include quinolone. Inorganic therapeutically-active compounds such as silver, silver salts, gold, or gold salts may also be bonded to the polymers of the present invention. This bonding may involve a covalent or an ionic interaction between the compound and the carboxylic acid group or amine group of the bifunctionalized polyester polymer.

The bifunctionalized polyester polymer which has bound an effective amount of the therapeutic compound or biologic agent can be used in any medical application in which biocompatible polymers are used (e.g., a biocompatible device), and in which infection or other complications are to be avoided. Examples include, but are not limited to, use as a wound dressing or implantable device. Desired devices are catheters, vascular grafts, artificial hearts, other artificial organs and tissues, blood filters, pacemaker leads, heart valves, and prosthetic grafts. The bifunctional polyester material, when used in vascular grafts, should not activate coagulation or inhibit cellular healing, is desirably biodurable, non-thrombogenic, chemically durable, resistant to infection or formation of microbial plaques, easy to implant, and possesses appropriate elastic properties. The bifunctional polyester material should also be sufficiently malleable so that it can form the appropriate geometry, but also have sufficient tensile strength to endure rigorous circulation throughout the vascular tree. The surface properties of the graft can be modified with biologically-active proteins in order to emulate certain natural properties of native vessels, thereby improving graft patency and healing. For instance, anti-thrombin (recombinant hirudin) or other anti-clotting agents, thrombolytic agents (e.g. streptokinase, urokinase, tissue plasminogen activator (tPA), pro-urokinase, etc.), and mitogenic agents (e.g. vascular endothelial growth factor) or other growth promoting substances, or inhibitors (e.g. γ-interferon) can be linked to the surface of the graft.

The biocompatible material should be able to be sterilized, for example, by gamma radiation.

In various embodiments, the bifunctionalized polyester polymer is non-toxic, does not contain an exogenous binder agent, and/or does not induce clot formation. The bifunctionalized polyester polymer can also be used in commercial products that are desirably antibacterial, antiviral, or antifungal (e.g., shower curtains, clothing, and foam cushions).

BRIEF DESCRIPTION OF THE DRAWINGS

(FIG. 2A), 10 min. (FIG. 2B), 20 min. (FIG. 2C), 40 min. (FIG. 2D), 120 min. (FIG. 2E), 240 min. (FIG. 2F), or overnight (16.25 hours; FIG. 2G), and exposed to methylene blue at pH 8.

(FIG. 3A), 10 min. (FIG. 3B), 20 min. (FIG. 3C), 40 min. (FIG. 3D), 120 min. (FIG. 3E), 240 min. (FIG. 3F), or overnight (16.25 hours; FIG. 3G), and exposed to acid red at pH 4.

FIGS. 4A–4E are a series of photographs of scoured ethylene diamine-treated polyester segments in which the uptake of methylene blue indicates the presence of carboxylic acid groups. Polyester segments are treated with 100% EDA (FIG. 4A), 90% EDA in water (FIG. 4B), 80% EDA in water (FIG. 4C), 70% EDA in water (FIG. 4D), or 50% EDA in water (FIG. 4E) for 80 minutes, rinsed in water for 10 min., and exposed to methylene blue at pH 8.

FIGS. 6A–6F are a series of photographs of scoured ethylene diamine-treated polyester segments in which the uptake of methylene blue indicates the presence of carboxylic acid groups. Polyester segments are treated with 100% EDA (FIG. 6A), 90% EDA in toluene (FIG. 6B), 80% EDA in toluene (FIG. 6C), 70% EDA in toluene (FIG. 6D), 50% EDA in toluene (FIG. 6E), or 25% EDA in toluene (FIG. 6F), for 80 minutes, rinsed in water for 10 min., and exposed to methylene blue at pH 8.

(FIG. 10A), 10 min. (FIG. 10B), 20 min. (FIG. 10C), 40 min. (FIG. 10D), 120 min. (FIG. 10E), 240 min. (FIG. 10F), or overnight (16.25 hours; FIG. 10G), and exposed to methylene blue at pH 8.

(FIG. 11A), 10 min. (FIG. 11B), 20 min. (FIG. 11C), 40 min. (FIG. 11D), 120 min. (FIG. 11E), 240 min. (FIG. 11F), or overnight (16.25 hours.

DETAILED DESCRIPTION

Figure 1:
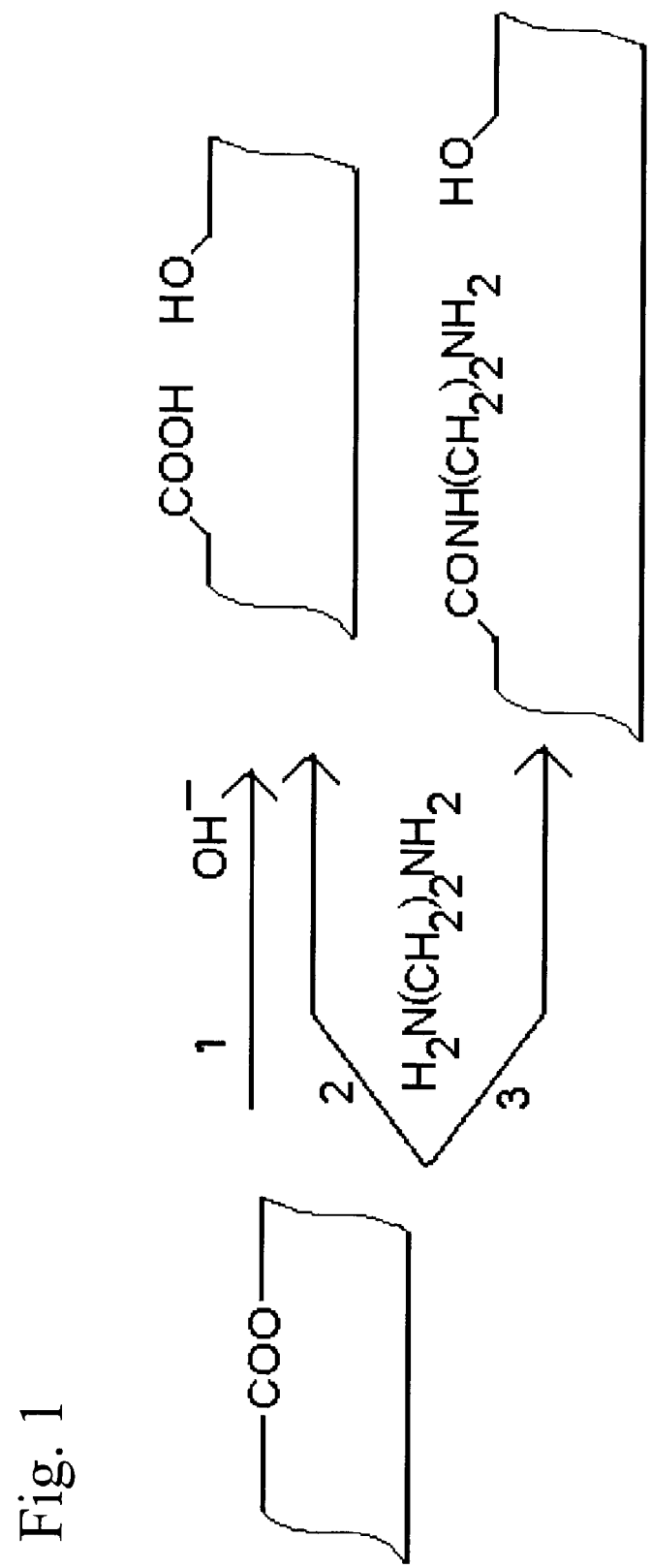
FIG. 1 is a schematic showing the hydrolysis and aminolysis of polyester.
Figure 2:
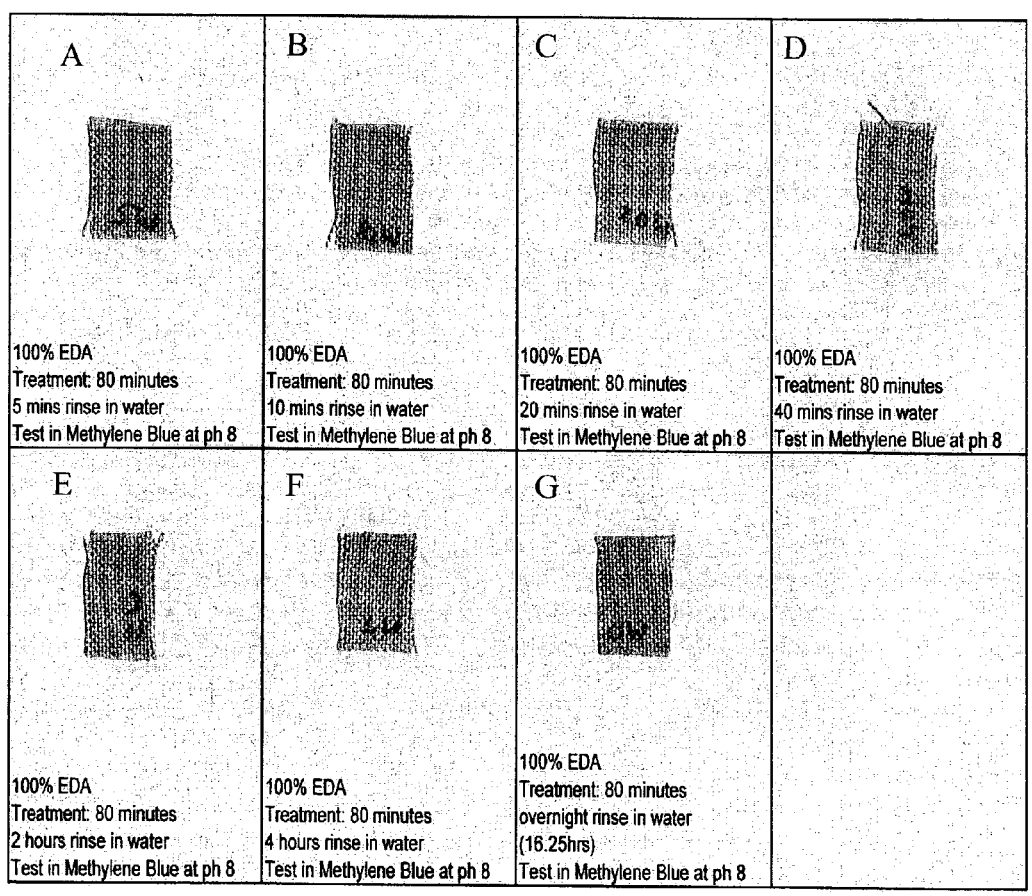
FIGS. 2A–2G are a series of photographs of scoured ethylene diamine-treated polyester segments in which the uptake of methylene blue indicates the presence of carboxylic acid groups. Polyester segments are treated with 100% EDA for 80 minutes, rinsed in water for 5 min.

The present invention features the use of a bifunctional amine compound, ethylene diamine (EDA), under select conditions (i.e., solution type, concentration, surface treatment) to establish both amine functional groups and carboxylic acid groups within the polyester backbone. The groups can then be reacted with various crosslinking agents, binders, catalysts or via direct ionic interaction with other moieties such as commercial finishes (i.e., flame retardants, repellents, anti-static agents, dyes) or biologically-active agents (i.e. anti-thrombolytic agents (e.g., anti-thrombin), thrombolytic agents, growth-promoting/inhibiting agents, antimicrobial or antifungal agents). The bifunctionalized polyester fiber can be provided for use in medical and textile applications.

Binding to Functional Groups

The treatment of polyester using this method establishes a bifunctional surface onto which various agents, such as growth factors, anti-thrombolytic agents (e.g., anti-thrombin), thrombolytic agents, or antibiotics, can be bound by ionic or covalent interactions, either alone or in combination. Several methods can be employed for application of various finishes and biologic moieties to the surface. For finishes, functional groups capable of reacting with amine moieties include epoxy, isocyanate, methylol, fluoro- and chlorotriazine, vinyl sulphone and the like. These reactive groups can be attached to substances capable of increasing or decreasing the hydrophobic nature of the polyester surface, and thus modifying the static, wicking, softness and repellency properties of the fiber. Because these substances are thereby covalently bonded to the polyester, their durability is substantially increased. For biologic moieties such as anti-thrombolytic agents (e.g., anti-thrombin), thrombolytic agents, and growth-promoting/inhibiting agents, various crosslinking techniques employing homo- and heterobifunctional crosslinkers can be utilized. Additionally, various inorganic and organic catalysts, reactive agents (i.e. glutaraldehyde) or binder agents can be used. Lastly, the ionic or hydrophilic properties of the material could be exploited to incorporate various antimicrobial/antifungal agents or biologic agents to the surface.

The presence of reactable amine groups on the polyester surface permits attachment thereto of a range of materials. Lewin et. al. outlined some of the possible reactions and functionalities: functional groups capable of reacting with amine moieties include epoxy, isocyanate, methylol, fluoro- and chlorotriazine, vinyl sulphone and the like (Lewin et al., *Handbook of fiber science and technology*, Vol. 2 Part B, New York, Marcel Dekker Inc. 1984). These reactive groups can be attached to substances capable of increasing or decreasing the hydrophobic nature of the polyester surface, and thus modifying the static, wicking, softness and repellency properties of the fiber. Because these substances are thereby covalently bonded to the polyester, their durability is substantially increased.

Finishes & Lubricants

Ranges of chemical finishes are available for spinning, weaving, knitting, and braiding productivity, as well as functional properties. They combine low fiber to metal frictional properties, good inter-fiber cohesion, and excellent anti-static properties to maximize fiber, filament or yarn performance. For example 16–20% Lurol NF-782 aqueous emulsion spin finish is recommended for fine denier filament yarns such as polyester with 0.8–1.2% take up on the weight of the yarn. The emulsion is prepared by adding the finish slowly into rapidly agitating 45–50° C. water. The emulsion should be translucent; opalescent in concentrations up to 20%. Typical properties include a clear yellow appearance of the liquid at 25° C., gardner color <1, Viscosity cSt 56 and pH of 8.2 in 5% aqueous solution. It begins to freeze if stored below 10° C. If frozen, the product should be warmed above 25° C. and stirred before use to insure homogeneity. Some bactericide should be added to the emulsion to assure adequate storage life.

Finish level can be measured by conventional solvent extraction techniques, e.g., using a blend of isopropanol and n-hexane as solvents for polyester.

The spinning finishes according to the invention may contain emulsifiers, wetting agents and/or antistatic agents and, optionally, standard auxiliaries, such as pH regulators, filament compacting agents, bactericides, and conductive polymers. Suitable emulsifiers, wetting agents and/or antistatic agents are anionic, cationic and/or nonionic surfactants, such as mono- and/or diglycerides, for example glycerol, mono- and/or dioleate, alkoxylated, preferably ethoxylated and/or propoxylated, fats, oils, fatty alcohols, castor oil containing 25 mol ethylene oxide (EO) and/or 16–18 fatty alcohol containing 8 mol propylene oxide and 6 mol EO, if desired alkoxylated 8–24 fatty acid mono- and/or diethanolamides, for example optionally ethoxylated oleic acid mono- and/or diethanolamide, tallow fatty acid mono- and/or diethanolamide and/or coconut oil fatty mono- and/or diethanolamide, alkali metal and/or ammonium salts of alkoxylated, preferably ethoxylated and/or propoxylated, optionally end-capped 8–22 alkyl and/or 8–22 alkylene alcohol sulfonates, reaction products of optionally alkoxylated 8–22 alkyl alcohols with phosphorus pentoxide or phosphorus oxychloride in the form of their alkali metal, ammonium and/or amine salts, for examples phosphoric acid esters of ethoxylated 12–14 fatty alcohols, neutralized with alkanolmine, alkali metal and/or ammonium salts of 8–22 alkyl sulfosuccinates, for example sodium dioctyl sulfosuccinate and/or amine oxide, for example dimethyl dodecyl amine oxide. In considering this list of examples, it is important to bear in mind that many of the substances mentioned can perform not just one function, but several functions. Thus, an antistatic agent may also act as an emulsifier.

Suitable filament compacting agents are the polyacrylates, fatty acid sarcosides and/or copolymers with makeic anhydride known from the prior art (Melliand Textilberichte (1977), page 197), polyurethanes according to DE-A-38 30 468, pH regulators (e.g., $C_{1-4}$ carboxylic acids and/or $C_{1-4}$ hydroxycarboxylic acids (e.g., acetic acid and/or glycolic acid)), alkali metal hydroxides (e.g., potassium hydroxide), amines (e.g., triethanolamine), and bactericides.

UV Inhibitors

Ranges of commercially available high performance fibers are susceptible to ultra violet (UV) exposure. A list of typical stabilizers against UV, both radical formation & biodegradation, includes: 2-hydroxybenzophenones, 2-hydroxypenyl-2-(2H)-benzotriazoles, cinnamates, and mixtures thereof. These chemicals are capable of absorbing and dissipating UV energy, thus inhibiting UV degradation. Free radicals are neutralized by hindered amine light stabilizers (HALS), butylated hydroxyanisole (BHA) and butylated hydroxytoluene (BHT).

Antimicrobials

Antimicrobials include silver nitrate, iodized radicals (e.g., TRIOSYN®; Hydro Biotech), benzylalkonium chloride and alkylpyridinium bromide (cetrimide) or alkyltrimethylammonium bromide. It is within the scope of this disclosure to coat or impregnate the bifunctionalized-polyester material disclosed herein as well as implants and prosthetic devices made therefrom with one or more materials which enhance its functionality, e.g., surgically useful substances, such as those which accelerate or beneficially modify the healing process when the material is implanted within a living organism. Thus, for example, antimicrobial agents such as broad spectrum antibiotics (gentamicin sulphate, erythromycin, or derivatized glycopeptides), which are slowly released into the tissue, can be incorporated to aid in combating clinical and subclinical infections in a surgical or trauma wound site. Other antimicrobials that can be used in the compositions of the invention include those described in U.S. Pat. Nos. 6,013,106; 6,464,971; 6,465,429; 6,471,974; 6,472,384; 6,472,424; 6,475,771; 6,479,454; 6,485,928; 6,492,328; 6,500,861; 6,506,737; 6,509,349; 6,436,445; 6,426,369; 6,423,748; 6,420,116; 6,417,217; 6,407,288; 6,387,928; and 6,376,670.

Growth Factors

To promote wound repair and/or tissue growth one or several substances can be introduced into the present composite biocompatible materials or impregnated into fabrics or prostheses made from the bifunctionalized polyester material. Exemplary substances include polypeptides such as human growth factors. The term "human growth factor"

or "HGF" embraces those materials, known in the literature, which are referred to as such and includes their biologically-active, closely related derivatives. The HGFs can be derived from naturally occurring sources and are preferably produced by recombinant DNA techniques. Specifically, any of the HGFs which are mitogenically-active and as such effective in stimulating, accelerating, potentiating or otherwise enhancing the wound healing process are useful herein. Growth factors contemplated for use include HEGF (urogastrone), TGF-beta, IGF, PDGF, and FGF. These growth factors, methods by which they can be obtained and methods and compositions featuring their use to enhance wound healing are variously disclosed in U.S. Pat. Nos. 3,883,497; 3,917,824; 3,948,875; 4,338,397; 4,418,691; 4,528,186; 4,621,052; 4,743,679 and 4,717,717; European Patent Applications 0 046 039; 0 128 733; 0 131 868; 0 136 490; 0 147 178; 0 150 572; 0 177 915 and 0 267 015; PCT International Applications WO 83/04030; WO 85/00369; WO 85/01284 and WO 86/02271, and UK Patent Applications GB 2 092 155 A; 2,162,851 A, and GB 2 172 890 A, all of which are incorporated by reference herein.

The surface of the bifunctionalized polyester polymer of the invention can be modified with biologically-active proteins in order to emulate some of the natural properties of native vessels, thereby improving graft patency and healing. For example, the enzymatic, chemotactic, and mitogenic properties of thrombin can be inhibited by surface bound rHir (recombinant hirudin). This inhibition can significantly reduce blood product formation and maintain anastomotic smooth muscle cells in the quiescent state, thereby preventing the formation of anastomotic intimal hyperplasis. rHir has been shown to have potent anti-thrombin activity when covalently immobilized onto a DACRON® surface (see, e.g., Phaneuf M. D., et al., *Biomaterials* 18(10):755 (1997) and Berceli S. A., et al., *J. Vasc. Surg.* 27:1117 (1998)), or to another biomolecule (see, e.g., Phaneuf M. D., et al., *Thromb. Haemostas.* 71(4):481 (1994)). In addition, covalent linkage of VEGF (vascular endothelial growth factor) may permit complete endothelialization of the graft surface by both trans-anastomotic and trans-membrane (through the remaining porosity) cellular migration. Techniques for binding growth promoting factors to biocompatible materials are described in U.S. Ser. No. 09/139,507 entitled "Growth-Promoting Biocompatible Substances and Methods of Use Thereof," and in Kubaska S. M. III, et al., *Surgical Forum* 49:322 (1998), which are herein incorporated by reference.

Covalent linkage of protein to a biomaterial surface in order to create a "basecoat" layer has numerous beneficial advantages. Non-specific or covalent attachment of a protein coating can "passivate" a surface that is relatively thrombogenic, thereby decreasing adhesion of blood products such as platelets, red blood cells, and fibrinogen (Rumisek J., et al., *Surgery* 105:654 (1989)). Proteins incorporated as a basecoat layer can be used as a "scaffolding" in order to promote a specific response such as linkage of RGD peptides to promote cell adhesion (Lin H. B., et al. *J. Biomed. Mater. Res.* 345:170 (1994)). Additionally, increasing the angstrom distance between a biologically-active molecule and the surface via polyethylene oxide groups can reduce steric hindrance on the target molecule, thereby maintaining activity (Park K. D., et al., *J Biomed. Mater. Res.* 22:977 (1988)).

Covalent linkage of a protein "basecoat" layer can serve as the spacer between rHir/VEGF and the biomaterial surface. Albumin can be used as the basecoat moiety. Albumin, which is in natural abundance in circulating blood, has numerous beneficial results in vitro and in vivo (see, e.g., Kotteke-Marchant K., et al., *Biomaterials* 10:147 (1989) and Phaneuf M. D., et al., *J Applied Biomater.* 6:289 (1995)). Utilization of a basecoat layer permits significant amplification of potential binding sites for secondary protein attachment via heterobifunctional crosslinkers; thus creating a biomaterial surface with distinct properties for a specific application. This technique has been used to provide numerous binding sites for rHir, for example (see, e.g., Phaneuf M. D., et al. *ASAIO J.* 44:M653 (1998) and Phaneuf M. D., et al., *Biomaterials* 18(10):755 (1997)). Examples of other basecoat proteins include, but are not limited to, collagen and fibronectin. Alternatively, the basecoat may be synthetic, such as, e.g., a Lys-Tyr moiety or polyethylene oxide.

Additives/Modifiers

Additional modifiers that can be applied to the bifunctionalized polyester material include, but are not limited to, the following: thermally conductive agents (e.g., graphite, boron nitride), ultraviolet-absorbing agents (e.g., benzoxazole, titanium dioxide, zinc oxide, benzophenone and its derivatives), water repellent agents (e.g., alkylsilane, stearic acid salts), therapeutic agents (e.g., antibiotics, hormones, growth factors), stain resistant agents (e.g., mesitol, CB-130), rot resistant agents (e.g., zinc chloride), adhesive agents (e.g., epoxy-resin, neoprene), anti-static agents (e.g., amines, amides, quaternary ammonium salts), biocidal agents (e.g., halogens, antibiotics, phenyl mercuric acetate), blood repellents (e.g., monoaldehyde urea resin), dye and pigments, electrically conductive agents (e.g., metal particles, zinc oxide, stannic oxide, indium oxide, carbon black, silver, nickel), electromagnetic shielding agents (e.g., hypophosphorous, carbon-phenol resin compounds), and flame retardant agents (e.g., aluminum hydroxide, borax, polyamide, magnesium hydroxide, polypropylene).

EXAMPLE 1

Figure 3:
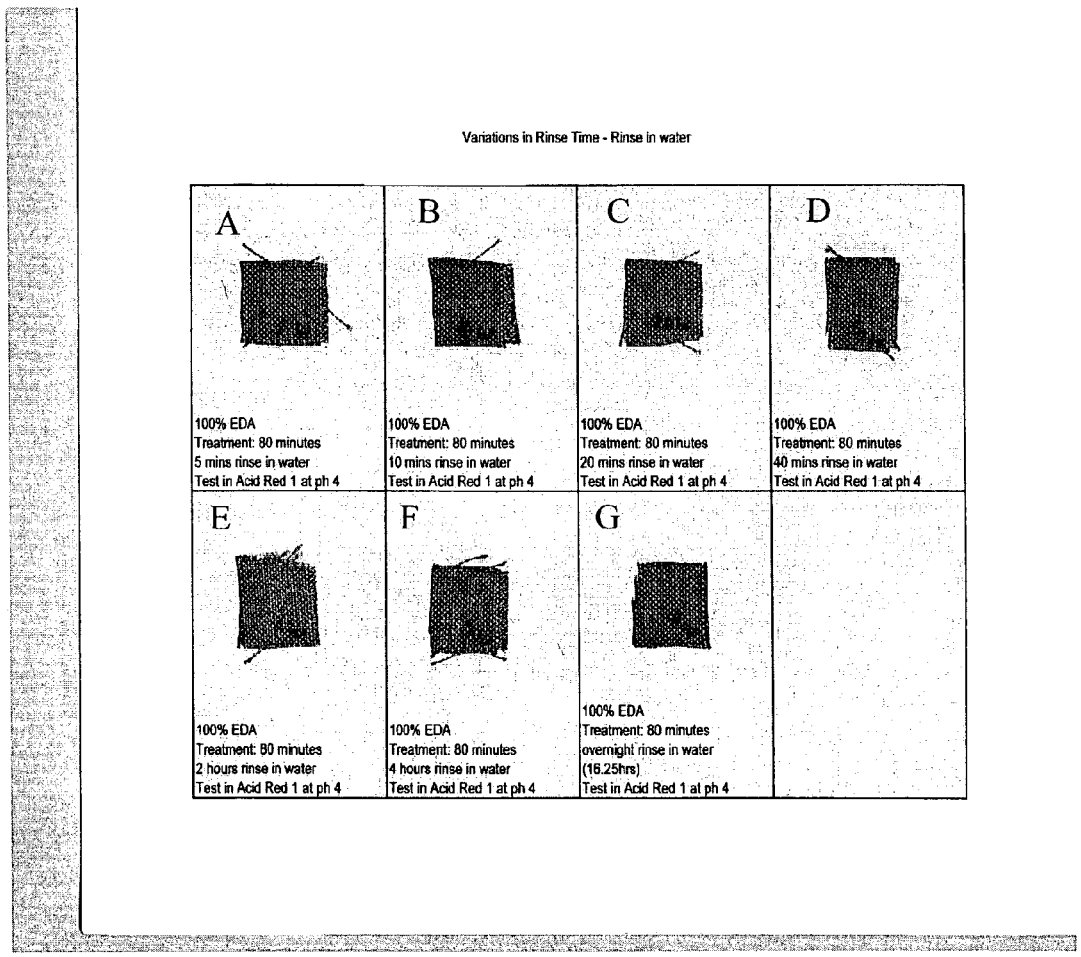
FIGS. 3A–3G are a series of photographs of scoured ethylene diamine-treated polyester segments in which the uptake of acid red indicates the presence of amine groups. Polyester segments are treated with 100% EDA for 80 minutes, rinsed in water for 5 min.
Figure 5:
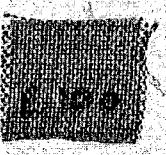
FIGS. 5A–5E are a series of photographs of scoured ethylene diamine-treated polyester segments in which the uptake of acid red indicates the presence of amine groups. Polyester segments are treated with 100% EDA (FIG. 5A), 90% EDA in water (FIG. 5B), 80% EDA in water (FIG. 5C), 70% EDA in water (FIG. 5D), or 50% EDA in water (FIG. 5E) for 80 minutes, rinsed in water for 10 min., and exposed to acid red at pH 4.
Figure 7:
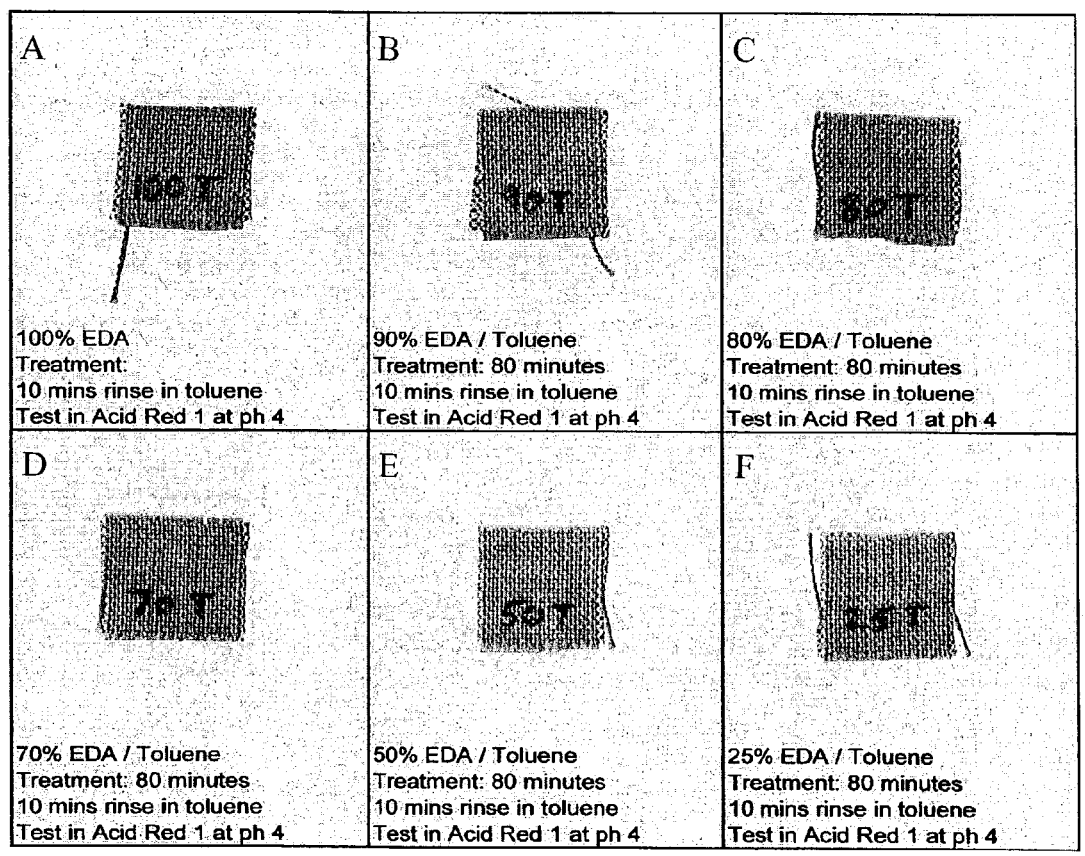
FIGS. 7A–7F are a series of photographs of scoured ethylene diamine-treated polyester segments in which the uptake of acid red indicates the presence of amine groups. Polyester segments are treated with 100% EDA (FIG. 7A), 90% EDA in toluene (FIG. 7B), 80% EDA in toluene (FIG. 7C), 70% EDA in toluene (FIG. 7D), 50% EDA in toluene (FIG. 7E), or 25% EDA in toluene (FIG. 7F), for 80 minutes, rinsed in water for 10 min., and exposed to acid red at pH 4.
Figure 8:
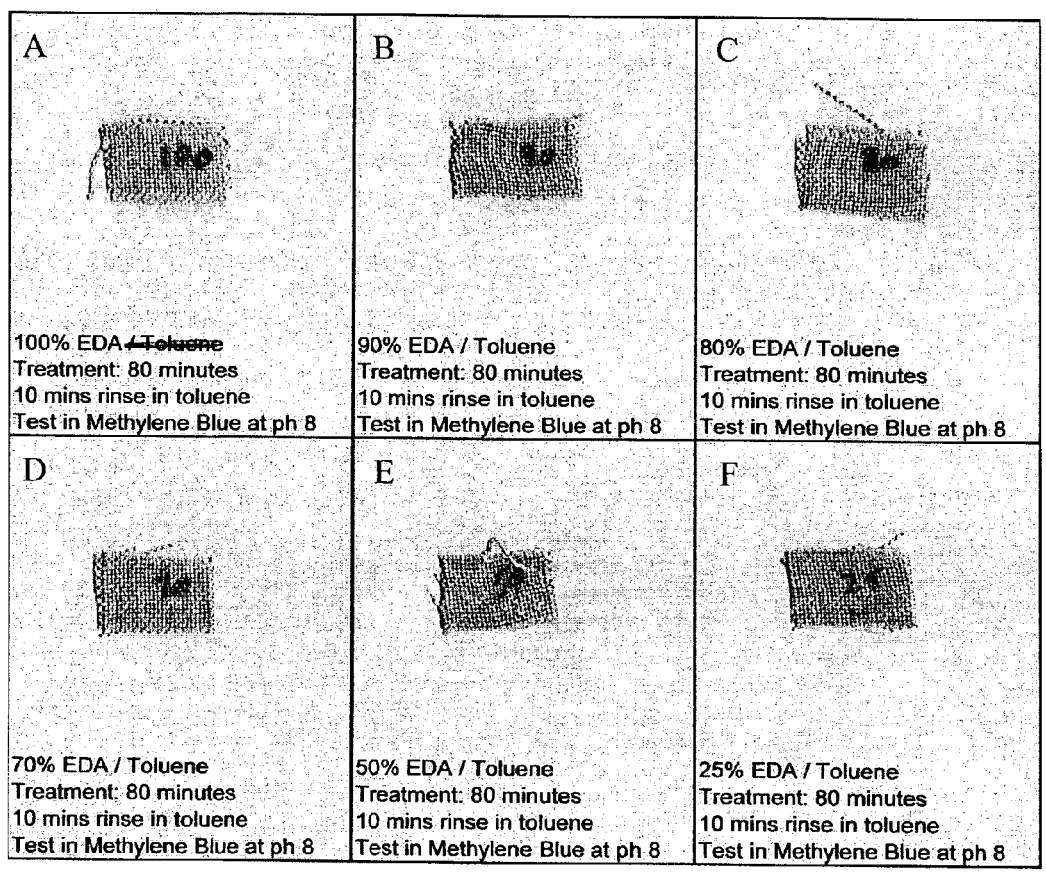
FIGS. 8A–8F are a series of photographs of hydrolysed ethylene diamine-treated polyester segments in which the uptake of methylene blue indicates the presence of carboxylic acid groups. Polyester segments are treated with 100% EDA (FIG. 8A), 90% EDA in toluene (FIG. 8B), 80% FDA in toluene (FIG. 8C), 70% EDA in toluene (FIG. 8D), 50% EDA in toluene (FIG. 8E), or 25% EDA in toluene (FIG. 8F), for 80 minutes, rinsed in water for 10 min., and exposed to methylene blue at pH 8.
Figure 9:
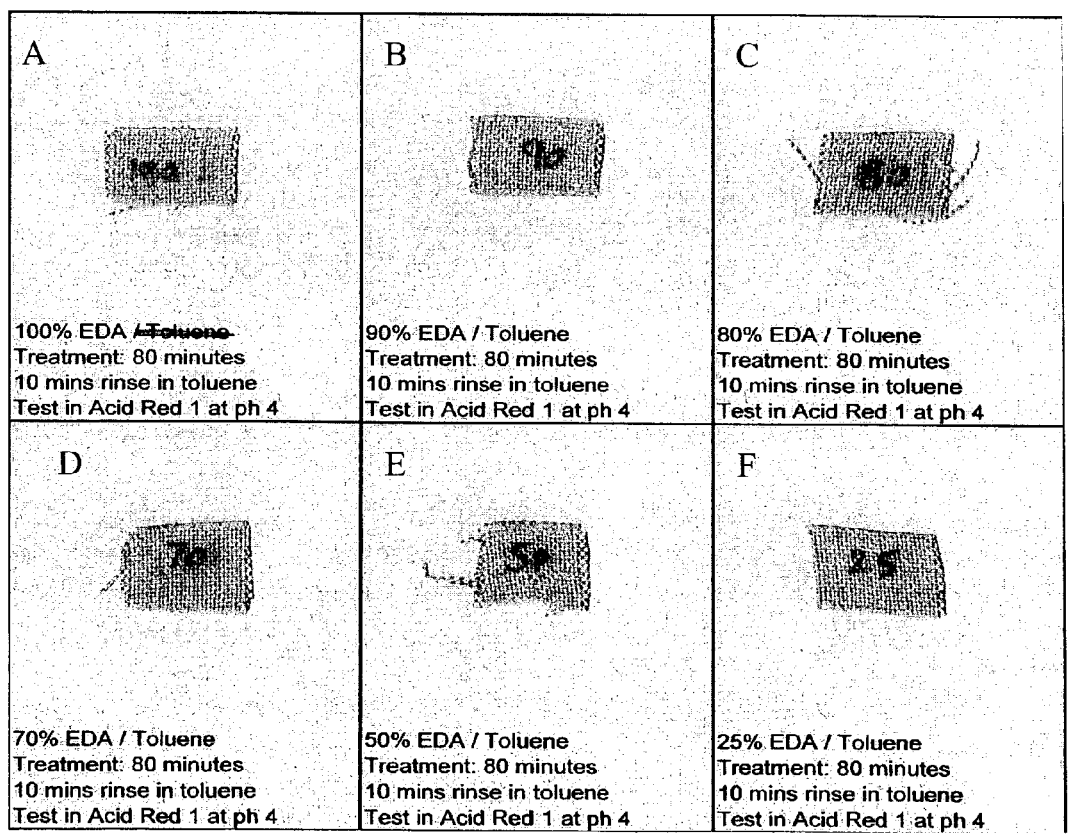
FIGS. 9A–9F are a series of photographs of hydrolysed ethylene diamine-treated polyester segments in which the uptake of acid red indicates the presence of amine groups. Polyester segments are treated with 100% EDA (FIG. 9A), 90% EDA in toluene (FIG. 9B), 80% EDA in toluene (FIG. 9C), 70% EDA in toluene (FIG. 9D), 50% EDA in toluene (FIG. 9E), or 25% EDA in toluene (FIG. 9F), for 80 minutes, rinsed in water for 10 min., and exposed to acid red at pH 4.
Figure 10:
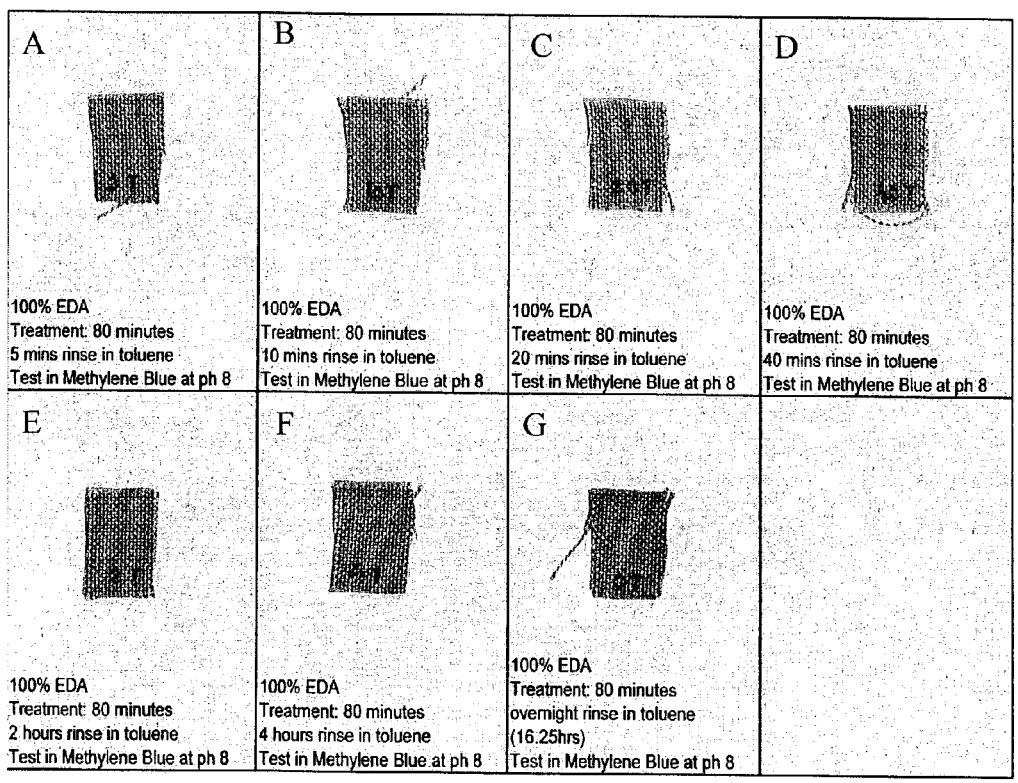
FIGS. 10A–10G are a series of photographs of ethylene diamine-treated polyester segments in which the uptake of methylene blue indicates the presence of carboxylic acid groups. Polyester segments are treated with 100% EDA for 80 minutes, rinsed in toluene for 5 min.

We tested whether we could generate amine functional groups on the surface of polyester by treatment with ethylene diamine (EDA). Exposure of the polyester to EDA created both carboxylic and amine groups within the polymer structure as evidenced by uptake of both methylene blue (FIGS. 2A–2G) and acid red (FIGS. 32A–3G). Formation of these groups could also be regulated by EDA concentration but was not significantly altered by the rinse time (see FIGS. 4A–4E for methylene blue determination of carboxylic acid groups and see FIGS. 5A–5E for acid red determination of amine groups). For the hydrolyzed material (HYD), carboxylic acid content decreased with increasing EDA concentration whereas amine content increased, suggesting amine groups were limited to the outer periphery of the fiber. Amine content in the hydrolyzed segments was not as elevated as the scoured segments (CNTRL). For the CNTRL and HYD polyesters, employing toluene as the solvent at lower concentrations increased carboxylic acid (see FIGS. 6A–6F for CNTRL and FIGS. 8A–8F for HYD) and amine (see FIGS. 7A–7F for CNTRL and FIGS. 9A–9F for HYD) formation. In contrast to the water washing studies, exposing the segments to a prolonged toluene rinse increased formation of both carboxylic acid (FIGS. 10A–10G) and amine (FIGS. 11A–11G) functional groups.

Determination of Amine/Carboxylic Acid Content via Textile Dye Uptake

EDA exposure to scoured (CNTRL) and hydrolyzed (HYD) segments resulted in a yellowish-brown coloration as compared to unmodified CNTRL and HYD surfaces, both of which remained white. Using acid red uptake, CNTRL-EDA (0.82±0.10 nmoles/mg) and HYD-EDA (0.32±0.02 nmoles/mg segments had 43- and 8-fold greater amine content as compared to their respective controls. Amine formation was 2.6-fold greater using CNTRL as compared to HYD material. Using methylene blue uptake, carboxylic acid content in the CNTRL-EDA segments increased 18-fold whereas a 40-fold decrease in carboxylic acid content occurred for the HYD-EDA segments. This carboxylic acid group loss in the HYD-EDA segments may be due to EDA reaction with the carboxylic acid groups created during the initial alkaline hydrolysis.

Determination of Primary Amine Functional Groups via Sulfo-SDTB

Sulfo-SDTB analysis of the control and EDA treated materials confirmed the creation of amine groups into the polymer structure of the EDA treated DACRON®. Additionally, amine content in the CNTRL-EDA (1.06±0.11 nmoles/mg) and HYD-EDA (0.36±0.03 nmoles/mg) segments was comparable to the results obtained in the dye uptake study.

Physical Characteristics of the EDA-Modified Polyester

Fiber weight loss from the CNTRL-EDA (2.3±0.55%) and HYD-EDA (1.3±0.25%) segments was 3.8- and 2.0-fold greater than their respective controls. The difference in fiber weight loss between HYD-EDA and CNTRL-EDA segments (HYD-EDA segments lost 1.9-fold less fibers than the CNTRL-EDA segments) could again be attributed due to EDA reaction with the carboxylic acid groups previously created on the fiber surface via alkaline hydrolysis thus restricting deep EDA penetration into the fiber.

Tensile strength of the CNTRL-EDA and HYD-EDA segments was decreased 1.7 and 1.3 fold as compared to CNTRL and HYD segments, respectively. Ultimate elongation also followed a similar trend, with a 1.6 and 1.3 fold loss in elongation in the CNTRL-EDA/HYD-EDA segments. Comparable to the fiber weight loss study, HYD segments were less affected by exposure to EDA as compared to the CNTRL segments.

Accessible amine and carboxylic acid groups have been created within the polymer backbone of both CNTRL and HYD polyester (e.g., DACRON®) materials as determined by dye uptake and sulfo-SDTB indicator. Additionally, the bulk physical characteristics of both materials still remain.

Materials and Methods

Polyester Preparation: Segments (5 cm×5 cm) were cut from a large woven fabric sample and washed in 500 ml scouring solution (10 g $Na_2CO_3$, 10 ml Tween 20 in 1 L double distilled water ($ddH_2O$)) for 30 minutes at 60° C. Samples were then rinsed in 500 ml $ddH_2O$ for 30 minutes at 60° C. (CNTRL) and air-dried overnight. Some of these scoured segments were then exposed to 500 ml of 0.5% NaOH at 100° C. for 30 minutes. Alternatively, other NaOH conditions ranging from 1–20% could also be employed. These pieces were then rinsed with $ddH_2O$ (room temperature) and air-dried overnight at room temperature.

Formation of Amine and Carboxylic Acid Groups: The primary procedure employed for this study was to incubate a 5 cm×5 cm segment of either control or hydrolyzed polyester into 100% ethylene diamine (EDA, Sigma) for 80 minutes at room temperature. The segments were then removed and placed into distilled water overnight (~16 hours) at room temperature, followed by air-drying at 60° C. for 2 hours. Several other approaches were performed. EDA concentration, rinse times and solvent type were performed for both control and hydrolyzed DACRON®.

Determination of Amine and Carboxylic Acid Content: Methylene blue, a cationic dye, was employed to qualitatively determine carboxylic acid groups within the EDA-exposed polyester segments. Briefly, a 500 ml stock solution (500 μg/ml) of methylene blue was prepared (80% Purity) in 0.1 M Tris-CL pH 8.0. A working solution of methylene blue was prepared by aliquotting 1 ml of the stock solution and bringing to a total volume of 100 ml with Tris buffer (5 μg/ml). Segments (1 $cm^2$) were then cut from scoured and hydrolyzed EDA segments. Working MB solution (4–10 ml) was added to each segment, and incubated for 1 hour on an inversion mixer. The segments were removed and placed into wash solution consisting of Tris buffer for one hour. Pre and post dye bath solutions were read at 611 nm using Tris buffer as blank. Segments were then grossly observed for color uptake and shade differences and photographed. Carboxylic acid content (nmoles/segment) weight (mg) was calculated using standard textile equations.

For amine content, acid red 1 (AR1), an anionic dye, was employed to quantitatively and qualitatively assess total (primary and secondary) amine content in the DACRON®-EDA segments. Briefly, a 500 ml stock solution of AR1 (0.5 mg/ml, dye purity=60%) was prepared in 0.01 M MES pH 4.5 (MES). A working solution of AR1 was prepared by aliquotting 10 ml of the stock solution and bringing to a total volume of 100 ml with MES buffer (50 mg/l). Segments (1.0 $cm^2$) were cut from the respective treatments. Working AR1 solution (2–3 ml) was added to each segment and incubated for 1 hour on an inversion mixer. The segments were removed and placed into wash solution of MES buffer for one hour. Pre and post dye bath solutions were read at 530 nm using MES buffer as the blank. Segments were then grossly observed for color uptake and shade differences and photographed. Amine content (nmoles)/segment weight (mg) was calculated using standard textile equations.

Determination of Primary Amine Functional Groups via Sulfo-SDTB: A stock buffer consisting of 50 mM sodium bicarbonate, pH 8.5 was prepared. CNTRL, HYD, CNTRL-EDA, and HYD-EDA segments (n=4/test condition; 1.0 $cm^2$) were cut and weighed. Sulfo-SDTB (3 mg) was weighed and dissolved in 1 ml dimethyl formamide. After thorough mixing, the sulfo-SDTB solution was brought up to a total volume of 50 ml with the stock sodium bicarbonate buffer (working sulfo-SDTB solution). Stock buffer (1 ml) and 1 ml working sulfo-SDTB solution were added to each tube and reacted for 40 minutes at room temperature on an orbital shaker. Segments were then removed and washed for 10 minutes in 5 ml of distilled water on an inversion mixer. Immediately following the wash, 2 ml of a perchloric acid solution was added to each segment. Segments were reacted for 15 minutes on the inversion mixer. The reaction solution (1 ml) was then removed and absorbance at 498 nm was measured. Using the extinction coefficient for sulfo-SDTB and the segment weight, amine content (nmoles/segment weight (mg) was determined.

Physical Characterization of EDA-Modified DACRON®: Fiber weight loss was determined post-exposure to either distilled water (control) or EDA. CNTRL and HYD segments were prepared as previously described. Segments (4 $cm^2$) were cut from each segment type (n=8 segments/treatment) and weighed. Half of the segments for each treatment were placed into distilled water and the other half placed into 100% EDA for 80 minutes. All segments were then transferred to distilled water for 16 hours, followed by air-drying at 60° C. for 2 hours. Segments were then reweighed, with the difference in segment weight determined.

Tensile strength and ultimate elongation were then determined. CNTRL, HYD, CNTRL-EDA, and HYD-EDA segments (width=1 inch, length=2 inches) were cut. A Q-test apparatus was calibrated at the time of use under a controlled climate (room temperature—24.7° C., humidity—75%). A 100-pound load cell was used and a pull rate of 12 inches/minute was set. A gauge length of 0.75 inch was set into the apparatus, with a total of 1.25 inches of each segment placed into the clamps. Stretching was then initiated and automatically stopped at the break of each segment. The peak load at break (1 lb) and the ultimate elongation for each segment was determined.

EXAMPLE 2

Figure 12:
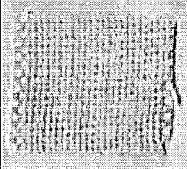
FIG. 12 is a photograph showing the uptake of CI Acid Red 1 or Methylene Blue dye after treatment of polyester fabric (hydrolyzed or unhydrolyzed) at 85° C. with 2-methylpentamethylene diamine (2MPD) for 10 minutes, tetraethylenepentamine (TEP) for 20 minutes, 1,2-diaminocyclohexane (12DC) for 2 hours, and 1,6-hexanediamine (16HD) for 24 hours.

We tested whether treatment of polyester fabric with amines other than EDA would result in the generation of functional amine groups. Polyester and hydrolyzed polyester were treated with four different multifunctional amines at a range of times and temperatures, and then dyed in diagnostic dyes. We specifically tested the uptake of CI Acid Red 1 or Methylene Blue dye by polyester fabric (hydrolyzed or unhydrolyzed) after treatment of the fabric at 85° C. with 2-methylpentamethylene diamine (2MPD) for 10 minutes, tetraethylenepentamine (TEP) for 20 minutes, 1,2-diaminocyclohexane (12DC) for 2 hours, and 1,6-hexanediamine (16HD) for 24 hours. The results of these treatments are shown in FIG. 12. The loss in tensile strength caused by these treatments is shown in Table 1.

TABLE 1

Effect of diamines on fabric strength

| | Amine/Treatment time @85 C. | | |
|---|---|---|---|
| | 2MPD 10 min | TEP 20 min | 12DC 2 hr |
| | % strength loss | | |
| Polyester | 15 | 15 | 64 |
| Hydrolyzed Polyester | 0 | 0 | 20 |

While these amines differ in the ease of reaction with polyester (roughly similar effects occurring at times ranging from 10 minutes to 24 hours), they are effective at providing amine groups at the fiber surface. It is notable that they also hydrolyze the surface and yield carboxylic acid groups (see below).

Treatment with EDA in Toluene

Figure 13:
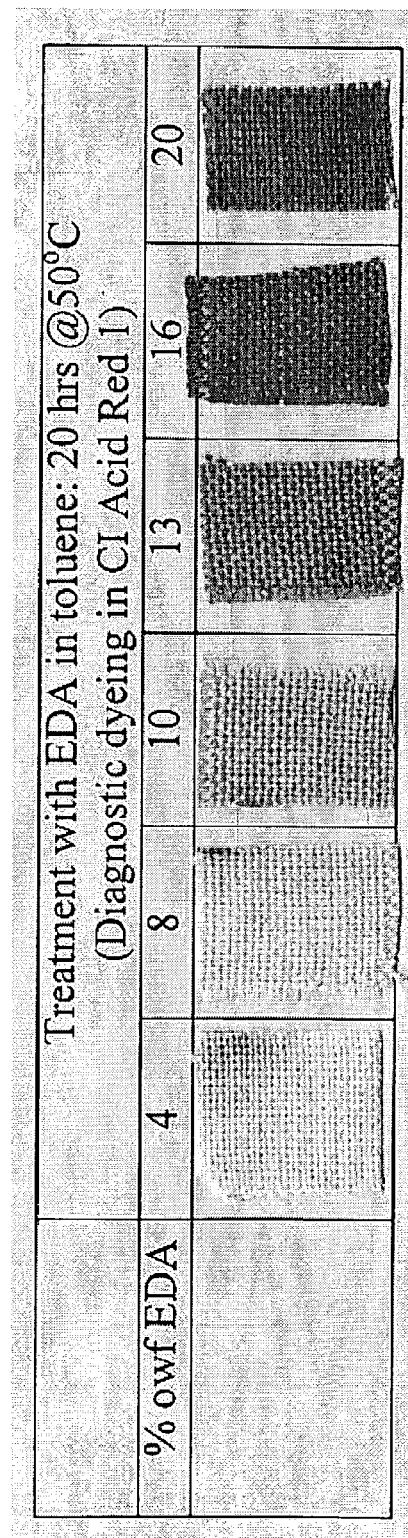
FIG. 13 is a photograph showing the uptake of CI Acid Red 1 dye after treatment of polyester fabric with varying concentrations of EDA in toluene for 20 hours at 50° C.

The effect of increasing EDA concentration when applied at constant temperature and time (i.e., 20 hours at 50° C.) is shown in FIG. 13. As expected, increasing the applied concentration of EDA results in the formation of more amine groups on the fiber, as is determined by the uptake of C.I. Acid Red 1 dye, and the reaction seems thus to be readily controllable in the manner of dye application.

Treatment with EDA

Figure 14:
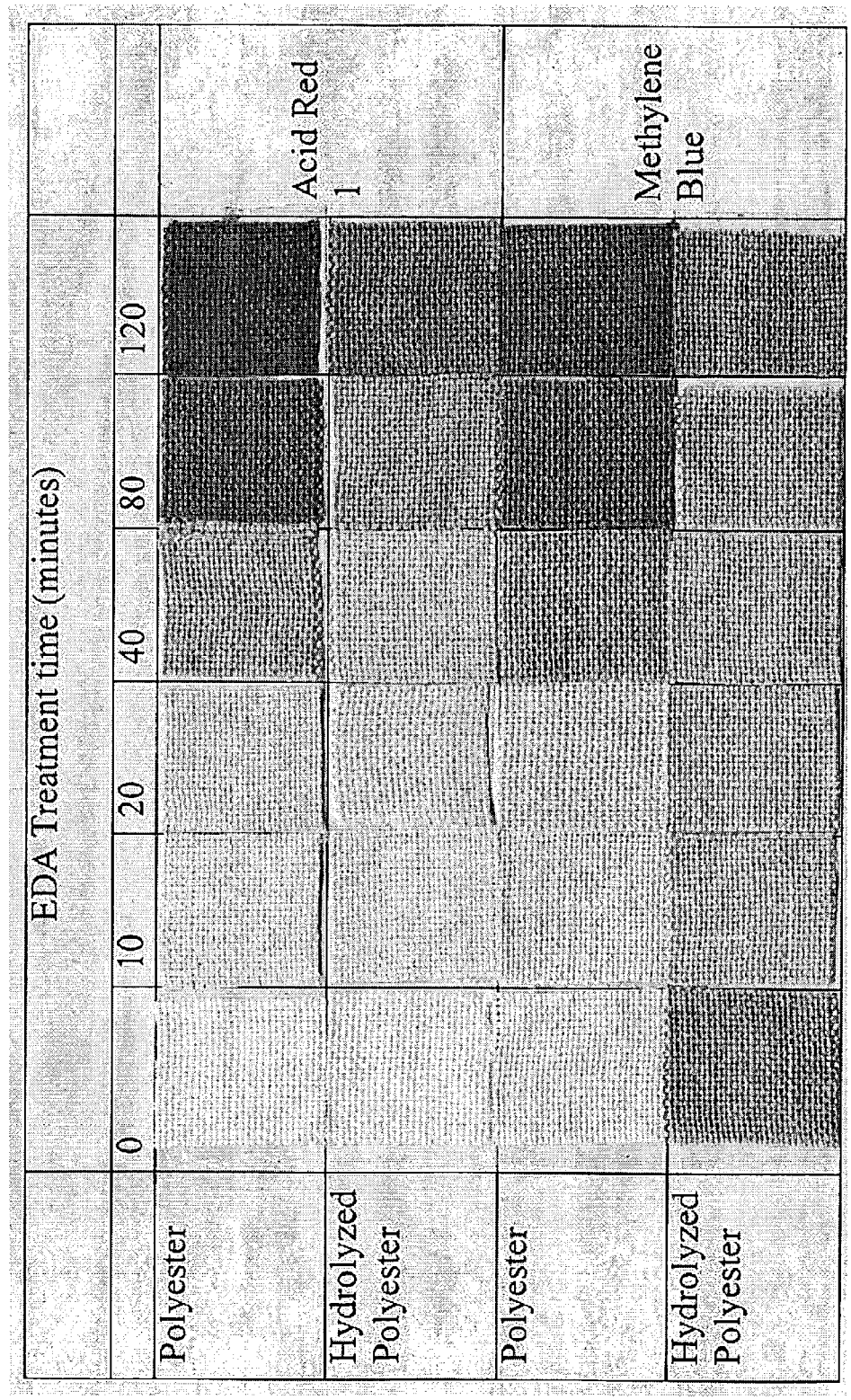
FIG. 14 is a photograph showing the uptake of Acid Red 1 or Methylene Blue dye into hydrolyzed or unhydrolyzed polyester fabric as a consequence of immersion time in EDA.

For the sake of simplicity, the basic reaction of polyester (original and hydrolyzed) in pure EDA at room temperature was used for the majority of the study to determine its effect on the fiber and its properties. The extent of treatment was controlled by the time of immersion in EDA. The gradual incorporation of amine groups at the polyester surface was followed by dyeing with C.I. Acid Red 1. The presumed reaction scheme is shown in FIG. 1, reaction 3. FIG. 14 shows the darkening of shade as treatment time increases. Noticeable is that the treatment on hydrolyzed material is less effective at generating amine groups. Perhaps more surprising is the result of diagnostic dyeing in Methylene Blue. As expected, the hydrolyzed material has carboxylic acid groups present, but the treatment of unhydrolyzed material with EDA also generates carboxylic acid groups. This is presumably due to hydrolysis involving the strongly basic diamine and any small amount of water present (FIG. 1, reaction 2). On treatment with EDA, the number of carboxylic acid groups in the hydrolyzed material initially decreases, and then increases again.

Figure 15:
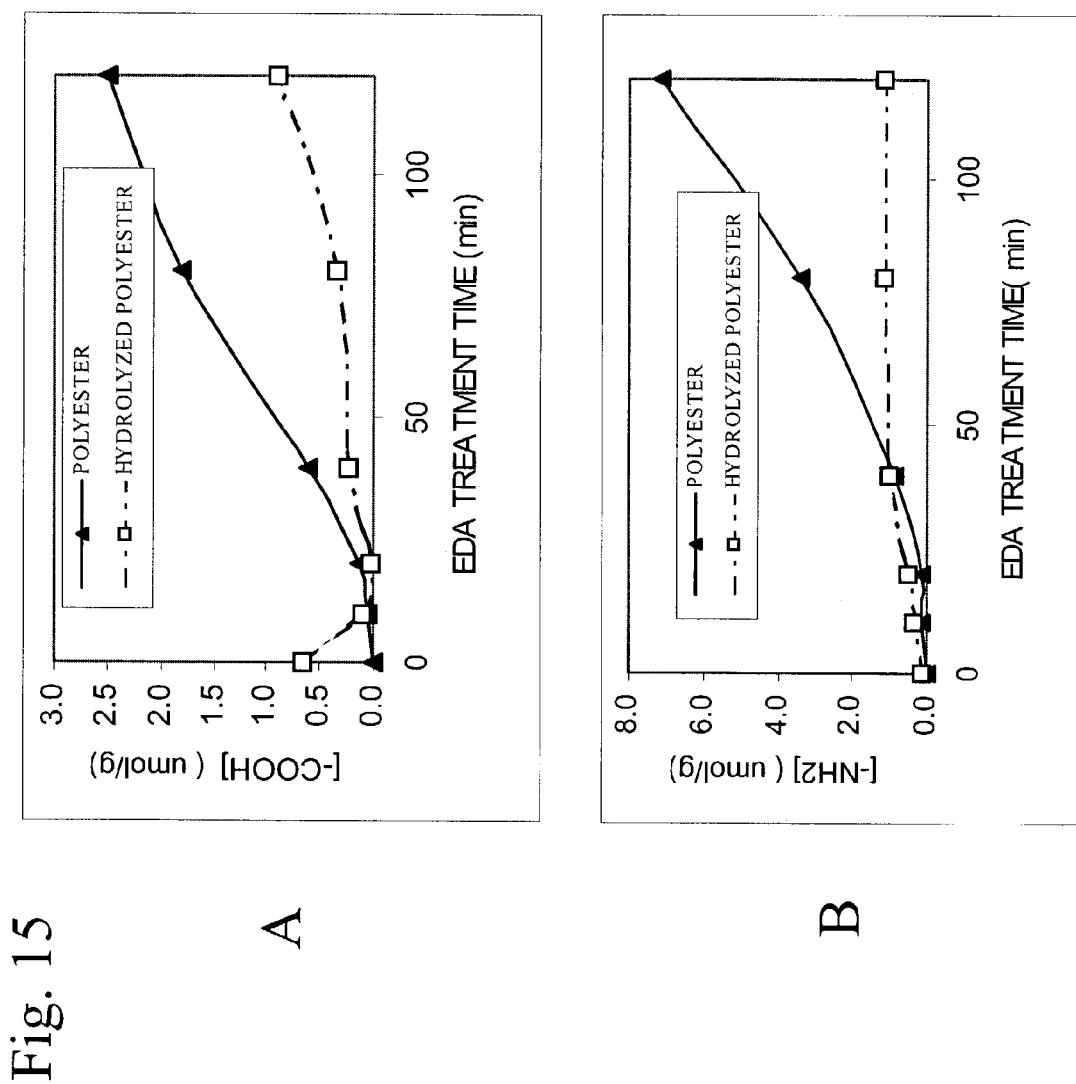
FIGS. 15A and 15B are graphs showing the concentration of amino (FIG. 15A) and carboxylic acid (FIG. 15B) groups after EDA treatment.
Figure 16:
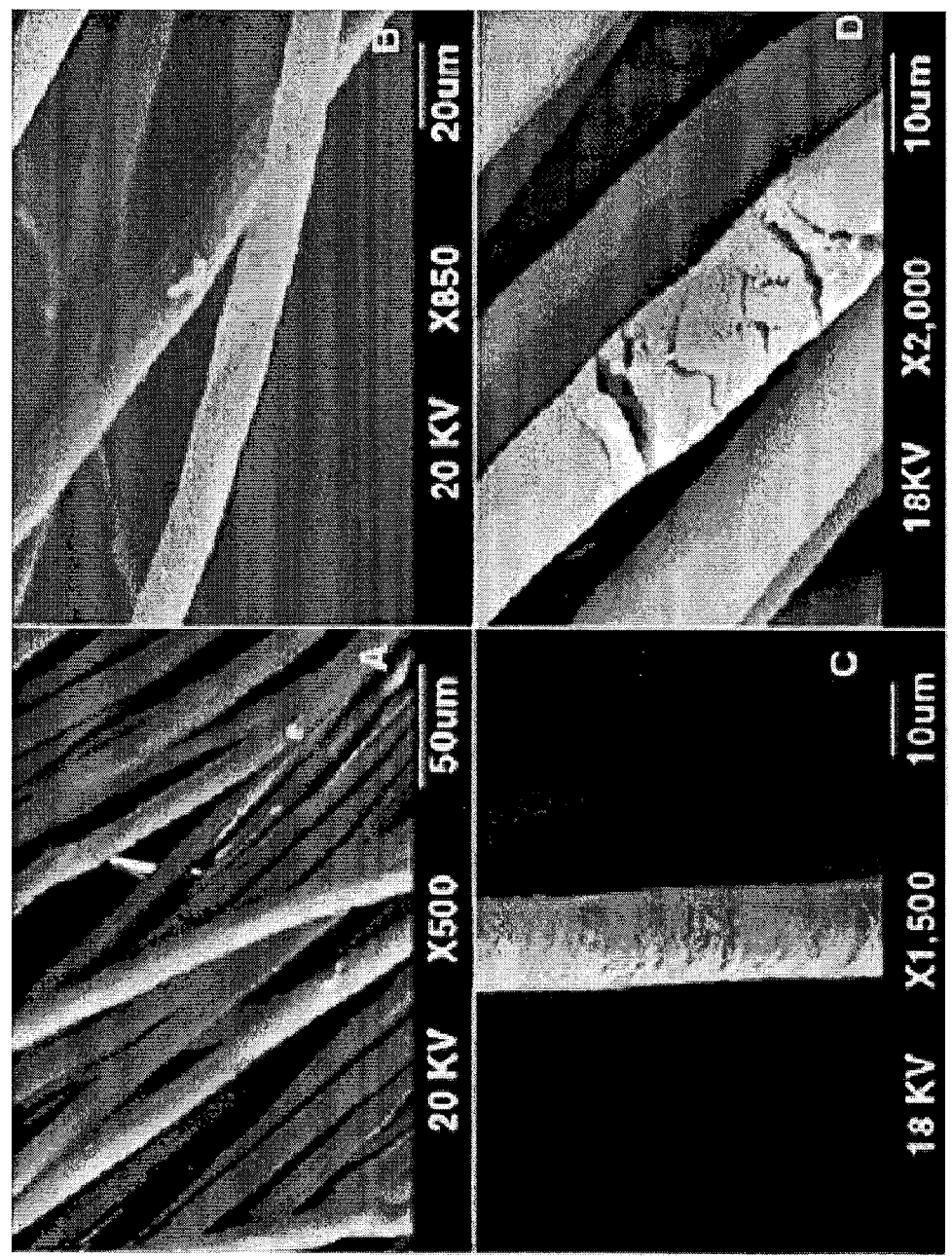
FIGS. 16A–16D are photographs at either 500×, 850×, 1500× or 2000× magnification, respectively, showing the cracking of polyester fibers.

The quantification of these functional groups via dyeing with dyes of known purity produced the results shown in FIGS. 15A and 15B. Again, the generation of fewer amine groups and the initial loss of carboxylic acid groups on the hydrolyzed material is shown.

Figure 17:
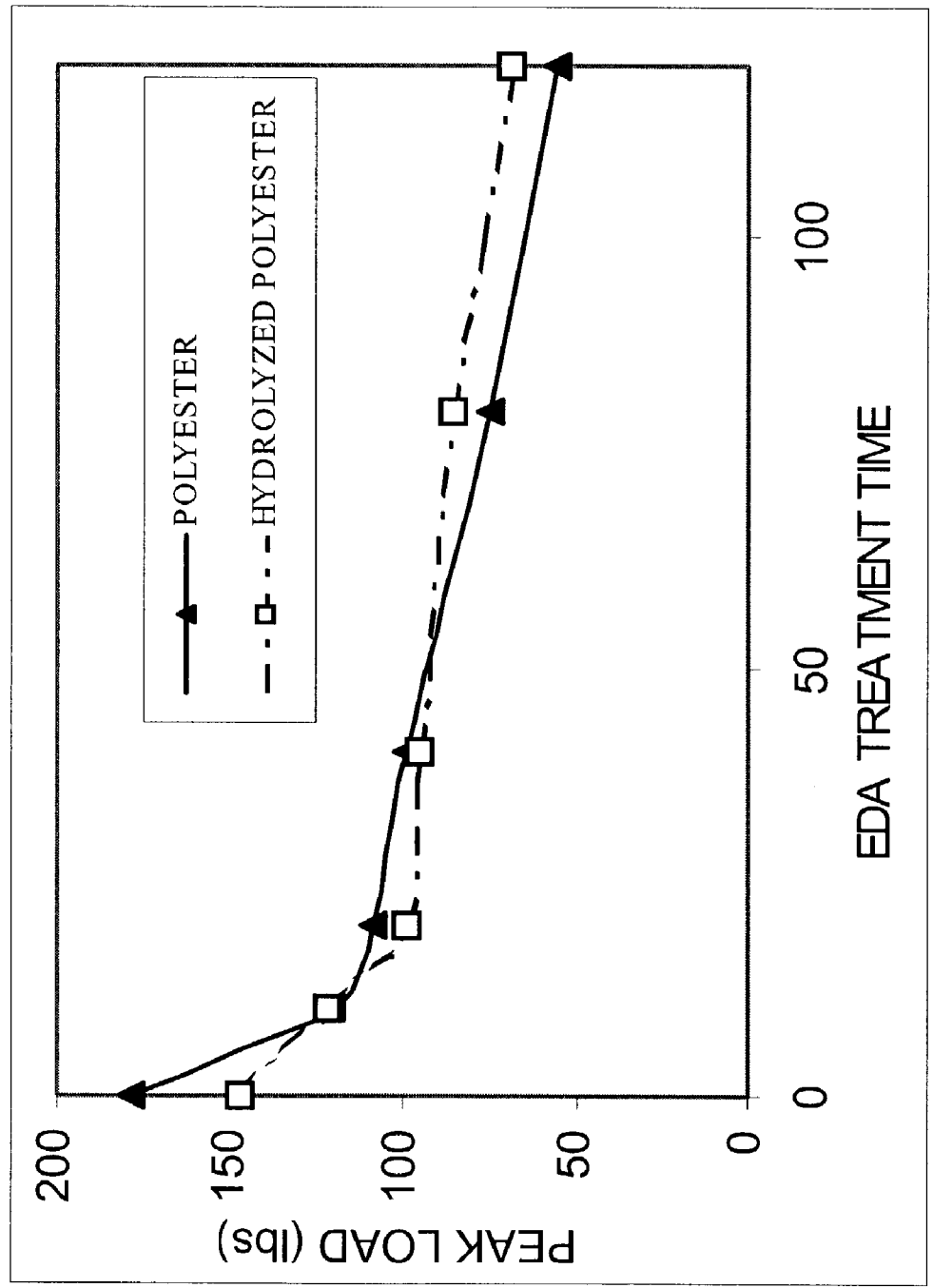
FIG. 17 is a graph showing the loss of tensile strength of EDA-treated polyester.

An electron micrograph of untreated polyester and hydrolyzed polyester, and both after treatment with EDA is shown in FIGS. 16A–16D. It seems apparent that aminolysis, as found in previous studies, is a more penetrating treatment for polyester. Examination of these images suggests that the aminolysis, once started, proceeds more quickly in the initial areas of attack: areas of cracking are isolated among apparently undamaged material. Avny and Rebenfeld postulated an "induction" period and a subsequent "autoaccelerated" reaction (J. Applied Polymer Science 32:4009, 1986). Cracking is also visible on extensively treated fibers using visible microscopy, and cross-sections of the diagnostically dyed fibers show the treatment to be confined to the fiber surface. The slowing of aminolysis by a previous hydrolysis is also apparent when the effect of this treatment on the tensile strength of the material is considered. FIG. 17 shows the change in tensile strength with time of EDA treatment. After an initial drop (comparable with the loss of strength on hydrolysis alone) the tensile strength falls more slowly as the treatment continues. This again seems to suggest that the effect is happening more quickly on a few areas, rather than very generally. Weight loss data supported this contention (Table 3): only after comparatively long treatment times is a significant weight loss noted.

TABLE 3

Weight Loss on EDA Treatment

| | EDA Treatment Time (min) | Weight loss (%) |
|---|---|---|
| Polyester | 80 | 0.85 |
| | 120 | 3.17 |
| Hydrolyzed Polyester | 80 | 0.15 |
| | 120 | 0.33 |

Efforts to determine the absorbency (wetting time) and static properties of these EDA-treated material were unsuccessful: all materials gave results that varied widely. The Soil Release ratings did, however, indicate that the EDA treatment has an effect (Table 4).

TABLE 4

Soil Release Ratings of Treated Polyester

| | SR Rating |
|---|---|
| Untreated | 3.63 |
| Hydrolyzed | 4.37 |
| EDA-treated | 4.13 |
| Hydrolyzed/EDA treated | 4.94 |

All treatments produced an improvement over untreated polyester. Alkaline hydrolysis, as previously established, gives an improvement in soil release. EDA treatment alone was less beneficial. A combination of hydrolysis and EDA treatment, however, gave excellent soil release properties.

Figure 18:
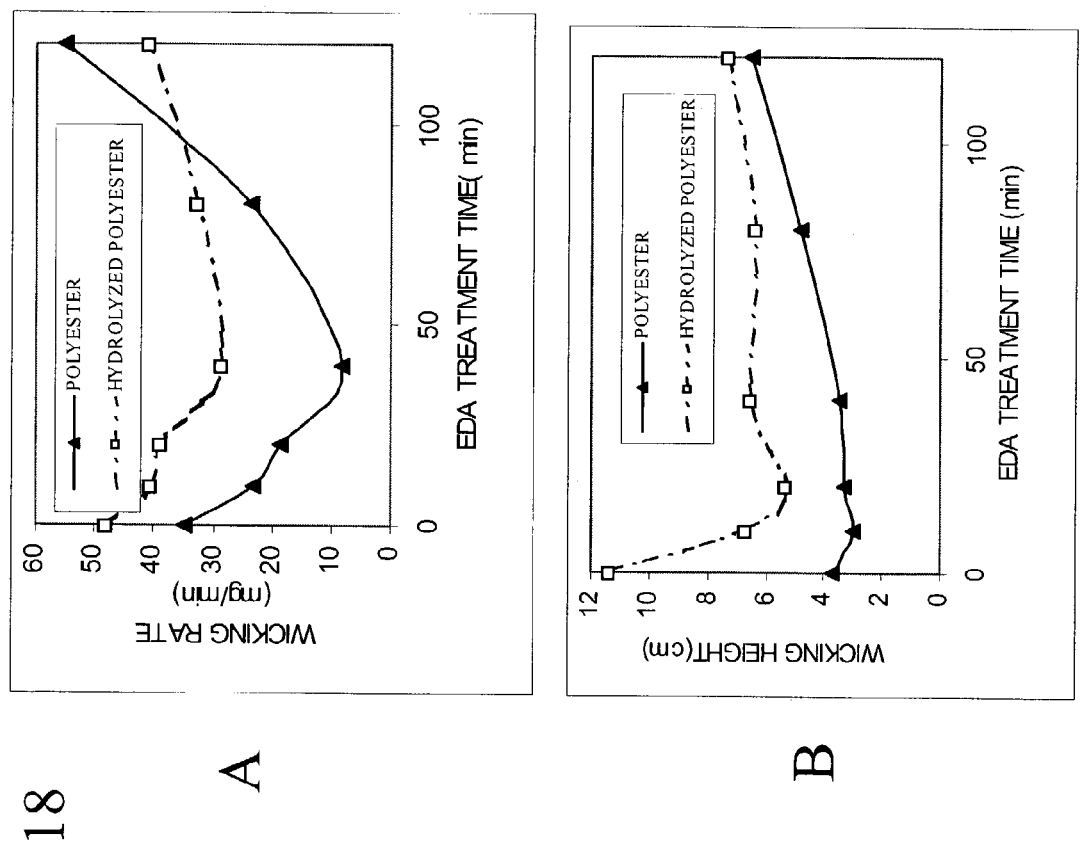
FIGS. 18A and 18B are graphs showing the wicking performance of EDA-treated polyester by weight (FIG. 18A) and by height (FIG. 18B).
Figure 19:
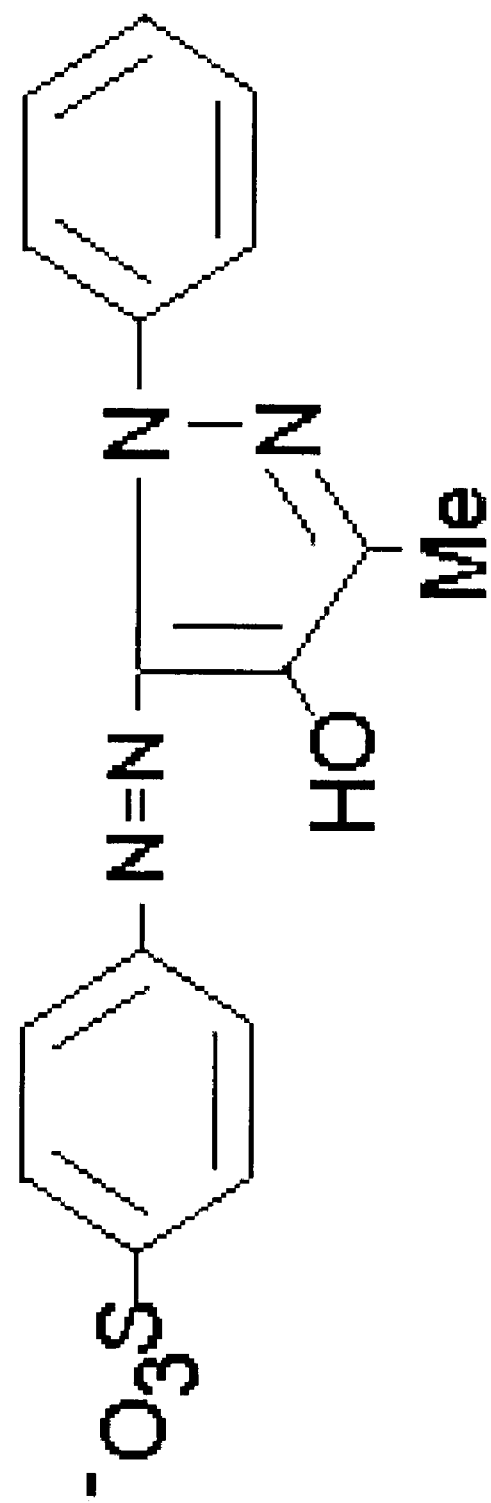
FIG. 19 is a drawing of C.I. Acid Yellow 4 dye.

The greater hydrophilicity of surface that the increased soil release properties imply is also represented in the wicking data (FIG. 18). The hydrolyzed surface wicks water at a greater rate when distance is measured. However, when the weight of water is considered, at longer treatment times the EDA treated material takes up a slightly greater weight of water; this is possibly due to the greater access to the fiber interior allowed by the surface cracking. In both cases there is a suggestion that at shorter times of EDA treatment, the wicking performance is reduced.

The treatment of polyester with bifunctional aliphatic amines, especially ethylene diamine, generates amine groups on the fiber surface, as expected. Somewhat surprisingly, the reaction results in the simultaneous formation of carboxylic acid groups in a manner akin to the familiar alkaline hydrolysis. The reaction is slower when applied to polyester that has previously been subjected to alklaline hydrolysis. The reaction is readily controllable, and when applied to untreated or hydrolysed polyester has the potential to provide polyester surfaces with varying levels of amine and carboxylic acid functionality. The treatment is of great potential use in modifying the biomedical properties of polyester, and will allow for the binding of different biologically-active agents (e.g. anti-thromboytic agents (e.g., anti-thrombin), thrombolytic agents, growth-promoting/inhibiting agents, antimicrobial or antifungal agents) to give multifunctional materials.

As would be expected from a more hydrophilic surface, wicking and soil release are improved by the treatment.

Materials and Methods

Polyester Material: A plain weave 100% polyester fabric was used in all experiments (Style 755, Testfabrics, Inc., West Pittston Pa.)

Chemicals: Chemicals used were laboratory grade, including ethylene diamine, ("EDA", 99%) and sodium hydroxide. All water used in the experiments was de-ionized. Methylene Blue was obtained in 99% purity. CI Acid Yellow 4, previously synthesized in our laboratory, was purified from salt impurities by extraction in N,N-dimethylformamide.

Apparatus: An Ahiba Polymat (Datacolor International) dyeing machine was used in the hydrolysis treatment: other reactions were carried out in simple glassware. A Cary 50 UV-Visible Spectrophotometer, Varian Pty Ltd, was used in measuring dye uptake. A Qtest CRE (Constant Rate of Extension) tester, MTS Systems Corporation was applied to determine the tensile property. A Joel 5900 Scanning Electronic Microscope was used to examine the morphological modification on the fiber surface.

Fabric Treatment: Polyester fabric was subjected to alkaline hydrolysis by treatment in 1.0% w/v sodium hydroxide for 1 hr at 98° C., LR 40:1, followed by rinsing in water and air-drying. These conditions were earlier found to provide surface carboxylic acid functionality with minimal strength and weight loss. Treatments in bifunctional amines were carried out under a range of conditions.

Multifunctional amines 1,6-hexanediamine (16HD), 2-methylpentamethylene diamine (2MPD), 1,2-diaminocyclohexane (12DC) and tetraethylenepentamine (TEP) were applied to polyester at 100% concentration (at 10:1 liquor ratio) in glass vials at a range of temperatures and times in a laboratory oven. Ethylene diamine was applied to untreated polyester from a range of solution concentrations in toluene. Specimens were rinsed in acetone and then water, and dried.

Both untreated and hydrolyzed polyester fabric specimens were treated by immersion flat in ethylene diamine (10:1 LR) at room temperature (25° C.) for a range of times. After each treatment, specimens were removed and rinsed in de-ionized water until the water reached neutral, and air dried. Fabrics were conditioned under standard conditions for 24 hours before physical tests.

Tests: The following tests were carried out on treated and untreated fabrics:

1. Surface functional groups were determined by dye uptake experiments. For simple visual analysis, carboxylic acid groups were visualized by the uptake of Methylene Blue from a 50:1 LR bath of 0.1 g/l solution in 1 g/l ammonia, with a treatment at 60° C. for 20 minutes. Amine groups were visualized by dyeing in C.I. Acid Red 1 (0.1 g/l in 1 g/l acetic acid, 50:1 LR, 60° C., 20 min).

Figure 11:
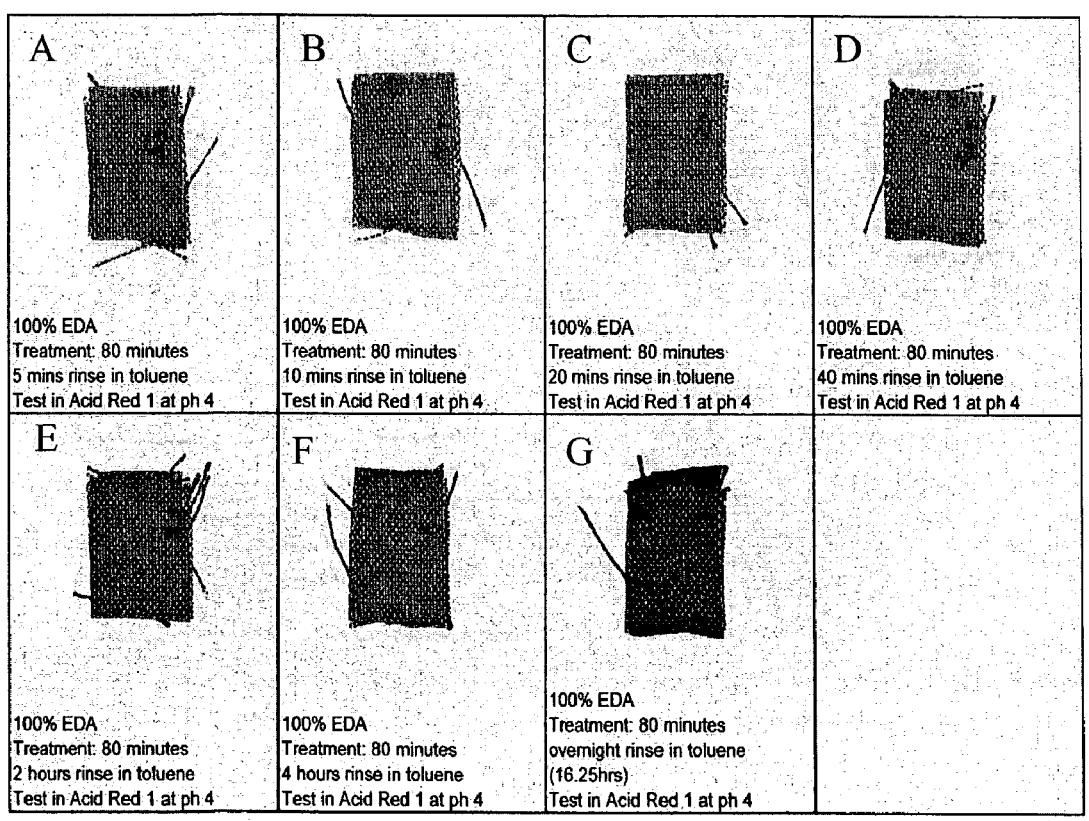
FIGS. 11A–11G are a series of photographs of ethylene diamine-treated polyester segments in which the uptake of acid red indicates the presence of amine groups. Polyester segments are treated with 100% EDA for 80 minutes, rinsed in toluene for 5 min.
FIG. 11OG), and exposed to acid red at pH 4.

For more accurate quantification, dyeing with Methylene Blue was carried out with 0.25% owf of dye, 50:1 liquor ratio, with temperature set to 40–50 ° C. for 50 minutes. Ammonium hydroxide was used to adjust the dye bath to pH 9.5. Amine groups were quantified by the uptake of purified CI Acid Yellow 4 under the same conditions, except that the pH was adjusted to 4.0 with acetic acid. This dye was chosen since it is of known formula and is monosulfonated (FIG. 11).

After dyeing, solutions were diluted to a convenient concentration and their absorbance measured. Dye uptake was calculated by reference to pre-established absorbance/concentration relationships.

The amino or carboxylic acid groups were quantified using the following equation:

$$\text{Functional Group Density} = (Q/M)/W$$

Where Q represents the amount of dye taken up, M is the molecular weight of the Dye, and W is the weight of the fabric.

2. Weight Change was determined by measuring the constant oven-dried weight of fabrics before and after aminolysis and is expressed in percentage. Specimens in this test were pre-raveled 1 cm from the edges to avoid weight loss caused by raveling of yarns from fabric during treatment and rinsing:

3. Tensile Loss was measured on 25×150 mm raveled fabric stripes obtained from the warp direction of conditioned fabric. Using a crosshead speed of 200 mm/min and gage of 75 mm, breaking load and elongation of specimens was determined. % Loss of tensile strength was calculated.

4. Wicking Properties were assessed in terms of both the rate and amount of water wicked. Specimens of 25×150 mm were weighted at one end and immersed to a depth of 10 mm in a beaker of water on an analytical balance (0.1 mg; FIG. 12). The weight of the beaker was recorded every minute over a ten-minute period, and the average rate of wicking (mg/min) calculated. In addition, the height to which the wicked water reached was measured, and the average height per five minutes calculated.

5. Wetting Time was measured using AATCC TM 79-2000 (Absorbency of bleached textiles).

6. Electrostatic Cling was measured using AATCC Method 115-2000.

7. Soil Release Properties were assessed using AATCC Test Method 130-2000.

EXAMPLE 3

We next sought to determine whether the generation of carboxylic acid or amine functional groups on polyester could be used to provide potential individual "anchor" sites for covalent attachment of biologically-active proteins. To address this issue, we modified polyester (DACRON®) as is described herein and quantified the protein binding to the carboxylic acid and amine groups on the surface.

Woven DACRON® patches (1 cm²) were treated with EDA for 80 minutes at 25° C. Patches were divided into three groups: untreated DACRON® (CTRL), control-EDA (C-EDA) DACRON®, and Tr-EDA DACRON® (EDA-treated DACRON® reacted with Traut's Reagent, a heterobifunctional crosslinker that reacts with primary amine groups on the surface). Bovine serum albumin (BSA, 1 mg) was radiolabeled with $^{125}$I. BSA was then reacted with the heterobifunctional crosslinker Sulfo-SMCC for 20 minutes at 37° C. Each group of patches was then incubated on an orbital shaker for 3 hours at 25° C. with $^{125}$I-BSA-Sulfo-SMCC.

A second study involved CTRL and C-EDA segments as well as EDC-EDA segments (EDA-treated patches reacted with EDC, a carbodiimide crosslinker that reacts with carboxylic acid groups on the surface). BSA (1 mg) was radiolabeled with $^{125}$I-BSA. Each group of patches was then incubated with $^{125}$I on an orbital shaker for 3 hours at 25° C.

A third study, which again involved CTRL and C-EDA patches, also assessed Tr-EDC-EDA patches (EDA-treated DACRON® patches reacted simultaneously with the Traut's Reagent and EDC). BSA (1 mg) was radiolabeled with either $^{125}$I or $^{131}$I. The $^{125}$I-BSA was again reacted with Sulfo-SMCC. Each group of patches was then simultaneously incubated with $^{125}$I-BSA-Sulfo-SMCC and $^{131}$I-BSA on an orbital shaker for 3 hours at 25° C. For each study, patches were washed in detergent and sonicated, followed by gamma counting. Lowry and TCA assays were performed to assess BSA concentration and radiolabeling efficiency, respectively. Using this data, specific activity for the BSA samples was calculated. Protein binding was then determined as amount of protein (ng) per DACRON® segment weight (mg).

Figure 20:
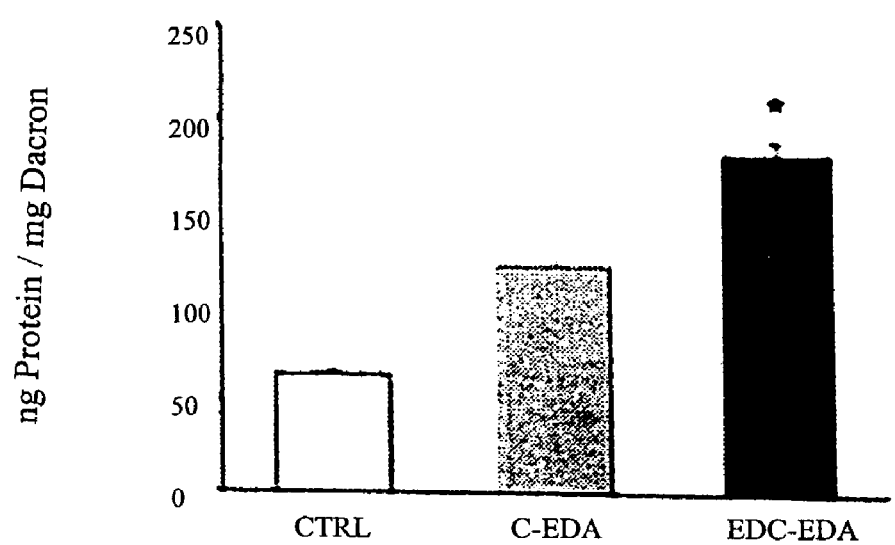
FIG. 20 is a graph showing the binding of $^{125}$I-BSA to EDA-modified DACRON® using amine groups.

Albumin binding, which was either non-specific or covalent, occurred on all of our surfaces. For the first single binding study, $^{125}$I-BSA binding to the Tr-EDA group (360±10 ng/mg) was 20.4 fold and 2.3 fold greater than CTRL (1.8±0.3 ng/mg, $p=2.5\times10^{-8}$) and C-EDA (155±3 ng/mg, $p=8.8\times10^{-7}$) segments, respectively (FIG. 20).

Figure 21:
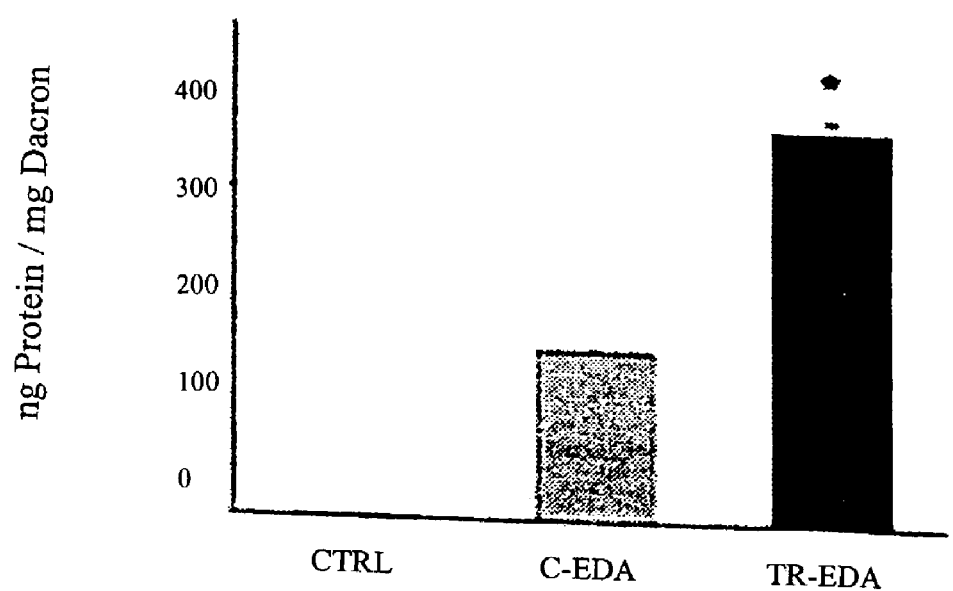
FIG. 21 is a graph showing the binding of $^{125}$I-BSA to EDA-modified DACRON® using carboxylic acid groups.

For the second single protein binding study, $^{125}$I-BSA binding to the EDC-EDA segments (184±6 ng/mg) was 2.9 fold and 1.5 fold greater than CTRL (64±3 ng/mg, $p=1.15\times10^{-6}$) and C-EDA (123±2 ng/mg, $p=4.79\times10^{-5}$) segments, respectively (FIG. 21).

Figure 22:
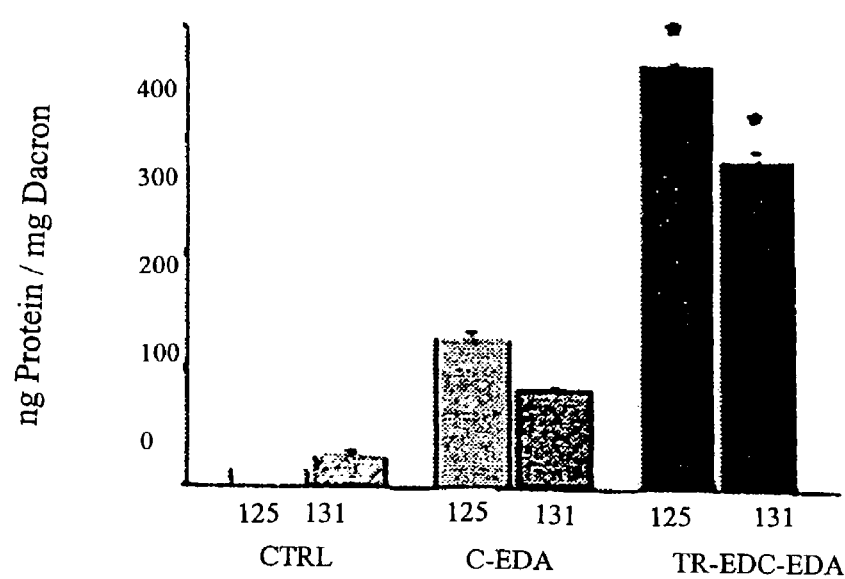
FIG. 22 is a graph showing the binding of $^{125}$I-BSA and of $^{131}$I-BSA to EDA-modified DACRON® using both amine and carboxylic acid groups.

For the double protein binding study, $^{125}$I-BSA and $^{131}$I-BSA binding to the Tr-EDC-EDA segments (367±6 ng/mg and 286±8 ng/mg, respectively) was 26.5 fold and 11.5 fold greater than CTRL segments (14±1 ng/mg, $p=1.5\times10^{-9}$; 25±5 ng/mg, $p=1.37\times10^{-4}$, respectively), and 2.9 fold and 3.1 fold greater than the C-EDA segments (127±6 ng/mg, $p=1.21\times10^{-7}$; 94±5 ng/mg, $p=4.5\times10^{-7}$, respectively; FIG. 22).

Reaction of EDA with DACRON® provides functional groups within the polymer backbone. These functional groups are accessible for either individual or simultaneous protein binding and can be used for covalent attachment of biologically-active proteins to the DACRON® surface.

EXAMPLE 4

In vitro and in vivo Assessment of Novel Bifunctionalized DACRON® Surfaces

We next sought to evaluate endothelial cell proliferation on DACRON® surfaces modified with the bifunctional amine ethylene diamine (EDA) in vitro and to assess the wound healing response to the modifications in vivo.

In vitro

MYLAR®, a flattened form of DACRON®, was used for in vitro experiments. Discs (1.5 cm diameter) were treated with either 15% NaOH for 30 minutes at 100° C. (HYDRO), EDA for 80 minutes at 25° C. (C-EDA), or a combination of NaOH and EDA (H-EDA) to create functional groups. Human umbilical vein endothelial cells (HUVEC) were then cultured with either complete media or serum-starved media on our modified MYLAR® surfaces. Untreated MYLAR® served as the control (CTRL). HUVECs added to tissue culture wells without MYLAR® were also monitored for cell viability. HUVEC growth was monitored at 1, 2, 3, and 4 days using an Alamar blue assay. Alamar blue interacts with the cell wall of live cells and can be detected at a fluorescence emission spectra of 590 nm.

HUVEC proliferation occurred on all of our modified surfaces throughout the four-day time interval. H-EDA surfaces demonstrated significantly greater HUVEC growth with complete media as compared to the CTRL surfaces (64.05±4.38 vs. 38.25±10.68, p=0.03). C-EDA surfaces demonstrated significantly prolonged HUVEC life with serum-starved media as compared to the CTRL surfaces (3.30±0.51 vs. 1.57±0.28, p=0.005).

In vivo

For the in vivo study, woven DACRON® patches (1 cm²) were treated using the same methods as employed for the MYLAR® discs. The patches were then implanted into a subcutaneous rat model for 14 days, explanted, and wound healing assessed using histological techniques.

Histological evaluation of our explanted patches revealed no impairment or overall difference in wound healing between the modified DACRON® patches and CTRL.

This study demonstrates that covalent attachment of biologically-active agents, such as growth factors, to the accessible functional groups on this DACRON® surface can be used to promote endothelial cell recruitment following, e.g., prosthetic arterial grafting.

Other Embodiments

All publications and patent applications mentioned in this specification are herein incorporated by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the appended claims.

Other embodiments are within the claims.

What is claimed is:

1. A composition comprising a bifunctionalized polyethylene terephthalate polymer comprising a carboxylic acid group derived from a terephthalate moiety of said polymer and an amine group derived from reaction of said polymer with a diamine, wherein said bifunctionalized polyethylene terephthalate polymer comprises a biologically-active agent that is covalently bonded to said polyethylene terephthalate polymer via said carboxylic acid group or said amine group, wherein said biologically-active agent is selected from a peptide, a polypeptide, a nucleic acid molecule, an antibody, and a small molecule.

2. The composition of claim 1, wherein said diamine is selected from ethylene diamine (EDA), 2-methylpentamethylene diamine, 1,2-diaminocyclohexane, and 1,6-hexanediamine.

3. The composition of claim 2, wherein said polyethylene terephthalate polymer is treated by alkaline hydrolysis prior to reaction with EDA.

4. The composition of claim 1 further comprising a chemical compound.

5. The composition of claim 4, wherein said chemical compound comprises a commercial finish selected from the group consisting of a flame retardant, a repellent, an antistatic agent, and a dye.

6. The composition of claim 1, wherein said biologically-active agent comprises an antimicrobial agent, an antifungal agent, an anti-thrombolytic agent a thrombolytic agent an antiviral agent, an antiseptic agent a growth-promoting agent, or a growth-inhibiting agent.

7. The composition of claim 1, wherein said polypeptide comprises anti-thrombin, fibronectin, fibrinogen, vitronectin collagen, streptokinase, urokinase, tissue plasminogen activator (tPA), vascular endothelial growth factor (VEGF), or gamma-interferon.

8. The composition of claim 7, wherein said anti-thrombin is hirudin.

9. A biocompatible device comprising a bifunctionalized polyethylene terephthalate polymer comprising a carboxylic acid group derived from a terephthalate moiety of said polymer and an amine group derived from reaction of said polymer with a diamine, wherein said bifunctionalized polyethylene terephthalate polymer comprises a biologically-active agent that is covalently bonded to said polyethylene terephthalate polymer via said carboxylic acid group or said amine group.

10. The device of claim 9, wherein said device is selected from the group consisting of a catheter, a vascular graft, an artificial heart, a blood filter, a pacemaker lead, a heart valve, and a prosthetic graft.

11. A wound dressing comprising a bifunctionalized polyethylene terephthalate polymer comprising a carboxylic acid group derived from a terephthalate moiety of said polymer and an amine group derived from reaction of said polymer wit a diamine, wherein said bifunctionalized polyethylene terephthalate polymer comprises a biologically-active agent bound thereto via said carboxylic acid group or said amine group.

12. The composition of claim 1, wherein said carboxylic acid group results from hydrolysis of said terephthalate moiety.

13. The composition of claim 2, wherein said diamine is EDA.

14. The device of claim 9, wherein said carboxylic acid group results from hydrolysis of said terephthalate moiety.

15. The device of claim 9, wherein said amine is selected from ethylene diamine (EDA), 2-methylpentamethylene diamine, 1,2-diaminocyclohexane, and 1,6-hexanediamine.

16. The device of claim 15, wherein said diamine is EDA.

17. The wound dressing of claim 11, wherein said carboxylic acid group results from hydrolysis of said terephthalate moiety.

18. The wound dressing of claim 11, wherein said diamine is selected from ethylene diamine (EDA), 2-methylpentamethylene diamine, 1,2-diaminocyclohexane, and 1,6-hexanediamine.

19. The wound dressing of claim 18, wherein said diamine is EDA.

20. A composition comprising a bifunctionalized polyethylene terephthalate polymer comprising a carboxylic acid group derived from a terephthalate moiety of said polymer and an amine group derived from reaction of said polymer with a diamine, wherein said bifunctionalized polyethylene terephthalate polymer comprises a chemical compound that is covalently bonded to said polyethylene terephthalate polymer via said carboxylic acid group or said amine group, wherein said chemical compound is selected from a flame retardant, a repellent, an antistatic agent, and a dye.

21. The composition of claim 20, wherein said carboxylic acid group results from hydrolysis of said terephthalate moiety.

22. The composition of claim 20, wherein said diamine is selected from ethylene diamine (EDA), 2-methylpentamethylene diamine, 1,2-diaminocyclohexane, and 1,6-hexanediamine.

23. The composition of claim 22, wherein said diamine is EDA.

24. The composition of claim 22, wherein said polyethylene terephthalate polymer is treated by alkaline hydrolysis prior to reaction with EDA.

25. The composition of claim 20 further comprising a biologically-active agent.

26. The composition of claim 25, wherein said biologically-active agent comprises an antimicrobial agent, an antifungal agent, an anti-thrombolytic agent, a thrombolytic agent, an antiviral agent, an antiseptic agent, a growth-promoting agent, or a growth-inhibiting agent.

* * * * *

UNITED STATES PATENT AND TRADEMARK OFFICE
CERTIFICATE OF CORRECTION

PATENT NO.        : 7,037,527 B2                              Page 1 of 1
APPLICATION NO.   : 10/352286
DATED             : May 2, 2006
INVENTOR(S)       : Bide et al.

It is certified that error appears in the above-identified patent and that said Letters Patent is hereby corrected as shown below:

Column 1, before "Field of Invention", insert
-- Statement Regarding Federally Sponsored Research
This work was supported by the Government under Grant No. R01 HL21796 from the National Institutes of Health. The Government has certain rights in this invention. --.

Column 13,
Line 38, in Table 1, replace "Hydrolyze" with - -Hydrolyzed- - ;
Line 39, in Table 1, replace "d Polyester" with - -Polyester- - .

Column 19,
Line 23, replace "anti-thrombolytic agent" with - -anti - thrombolytic agent, - - ;
Line 23, replace "thrombolyic agent" with - -thrombolytic agent, - -;
Line 24, replace "antiseptic agent" with - -antiseptic agent, - -;
Line 27, replace "vitronectin" with - -vitronectin, - - ; and
Line 50, replace "wit" with - -with- - .

Signed and Sealed this

Fifth Day of September, 2006

JON W. DUDAS
*Director of the United States Patent and Trademark Office*